US011461912B2

(12) United States Patent
Matthies et al.

(10) Patent No.: US 11,461,912 B2
(45) Date of Patent: Oct. 4, 2022

(54) GAUSSIAN MIXTURE MODELS FOR TEMPORAL DEPTH FUSION

(71) Applicant: California Institute of Technology, Pasadena, CA (US)

(72) Inventors: Larry H. Matthies, Northridge, CA (US); Cevahir Cigla, Pasadena, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 1112 days.

(21) Appl. No.: 16/040,006

(22) Filed: Jul. 19, 2018

(65) Prior Publication Data
US 2018/0322646 A1 Nov. 8, 2018

Related U.S. Application Data

(63) Continuation-in-part of application No. 15/394,647, filed on Dec. 29, 2016, now Pat. No. 10,665,115.
(Continued)

(51) Int. Cl.
*G05D 1/00* (2006.01)
*G05D 3/00* (2006.01)
(Continued)

(52) U.S. Cl.
CPC ............ *G06T 7/579* (2017.01); *B64C 39/024* (2013.01); *B64C 39/028* (2013.01); *B64D 47/08* (2013.01);
(Continued)

(58) Field of Classification Search
CPC ........... G06T 7/579; G06T 2207/10021; G06T 2207/10028; G06T 2207/10032; G06T 2207/20076; G06T 2207/30261; G06V 20/64; G06V 10/751; G06V 20/10; G06V 20/13; B64C 39/024; B64C 39/028; B64C 2201/027; B64C 2201/123; B64C 2201/127; B64D 47/08; G06K 9/6226; G06K 9/6289; G08G 5/0069; G08G 5/045
(Continued)

(56) References Cited

U.S. PATENT DOCUMENTS 8,234,068 B1 7/2012 Young et al.
8,244,458 B1 8/2012 Blackburn
(Continued)

OTHER PUBLICATIONS

Final Office Action dated Jul. 10, 2020 for U.S. Appl. No. 16/150,585.
(Continued)

*Primary Examiner* — Mahmoud S Ismail
(74) *Attorney, Agent, or Firm* — Gates & Cooper LLP

(57) ABSTRACT

A method and system provide for temporal fusion of depth maps in an image space representation. A series of depth maps are obtained/acquired from one or more depth sensors at a first time. A first Gaussian mixture model (GMM) is initialized using one of the series of depth maps. A second depth map is obtained from the depth sensors at a second time. An estimate of the motion of the depth sensors, from the first time to the second time, is received. A predictive GMM at the second time is created based on a transform of the first GMM and the estimate of the motion. The predictive GMM is updated based on the second depth map.

20 Claims, 15 Drawing Sheets

Related U.S. Application Data

(60) Provisional application No. 62/397,284, filed on Sep. 20, 2016, provisional application No. 62/274,924, filed on Jan. 5, 2016.

(51) Int. Cl.

| | |
|---|---|
| G06F 7/00 | (2006.01) |
| G06F 17/00 | (2019.01) |
| G06T 7/579 | (2017.01) |
| G08G 5/04 | (2006.01) |
| G08G 5/00 | (2006.01) |
| G06K 9/62 | (2022.01) |
| B64C 39/02 | (2006.01) |
| B64D 47/08 | (2006.01) |
| G06V 10/75 | (2022.01) |
| G06V 20/10 | (2022.01) |
| G06V 20/13 | (2022.01) |
| G06V 20/64 | (2022.01) |

(52) U.S. Cl.
CPC ......... *G06K 9/6226* (2013.01); *G06K 9/6289* (2013.01); *G06V 10/751* (2022.01); *G06V 20/10* (2022.01); *G06V 20/13* (2022.01); *G06V 20/64* (2022.01); *G08G 5/0069* (2013.01); *G08G 5/045* (2013.01); *B64C 2201/027* (2013.01); *B64C 2201/123* (2013.01); *B64C 2201/127* (2013.01); *G06T 2207/10021* (2013.01); *G06T 2207/10028* (2013.01); *G06T 2207/10032* (2013.01); *G06T 2207/20076* (2013.01); *G06T 2207/30261* (2013.01)

(58) Field of Classification Search
USPC .......................................................... 701/1
See application file for complete search history.

(56) References Cited

U.S. PATENT DOCUMENTS

| 9,563,201 | B1 | 2/2017 | Tofte | |
|---|---|---|---|---|
| 9,927,809 | B1 | 3/2018 | Tofte | |
| 10,043,279 | B1* | 8/2018 | Eshet | G06T 7/593 |
| 2005/0171654 | A1 | 8/2005 | Nichols et al. | |
| 2005/0216181 | A1 | 9/2005 | Estkowski et al. | |
| 2007/0080825 | A1 | 4/2007 | Shiller | |
| 2007/0093945 | A1 | 4/2007 | Grzywna et al. | |
| 2008/0027591 | A1 | 1/2008 | Lenser et al. | |
| 2009/0087029 | A1 | 4/2009 | Coleman et al. | |
| 2011/0160950 | A1 | 6/2011 | Naderhirn et al. | |
| 2011/0178658 | A1 | 7/2011 | Kotaba et al. | |
| 2011/0304633 | A1 | 12/2011 | Beardsley et al. | |
| 2012/0265380 | A1 | 10/2012 | Kuwata et al. | |
| 2013/0235047 | A1 | 9/2013 | Xia et al. | |
| 2013/0243240 | A1* | 9/2013 | Marks | F24F 11/30 |
| | | | | 382/103 |
| 2014/0029788 | A1* | 1/2014 | Kang | G06K 9/2018 |
| | | | | 382/103 |
| 2015/0301529 | A1 | 10/2015 | Pillai et al. | |
| 2016/0070264 | A1 | 3/2016 | Hu et al. | |
| 2016/0070265 | A1 | 3/2016 | Liu et al. | |
| 2016/0076892 | A1 | 3/2016 | Zhou et al. | |
| 2016/0216710 | A1 | 7/2016 | Hu et al. | |
| 2016/0260328 | A1 | 9/2016 | Mishra et al. | |
| 2016/0299507 | A1 | 10/2016 | Shah et al. | |
| 2016/0341830 | A1 | 11/2016 | Dougan | |
| 2016/0378109 | A1 | 12/2016 | Raffa et al. | |
| 2017/0031369 | A1 | 2/2017 | Liu et al. | |
| 2017/0052541 | A1 | 2/2017 | Hu et al. | |
| 2017/0053169 | A1* | 2/2017 | Cuban | B64C 39/024 |
| 2017/0123425 | A1 | 5/2017 | Zhao | |
| 2017/0124717 | A1* | 5/2017 | Baruch | G06T 7/194 |
| 2017/0134631 | A1 | 5/2017 | Zhao et al. | |
| 2017/0193830 | A1 | 7/2017 | Fragoso et al. | |
| 2017/0253330 | A1 | 9/2017 | Saigh et al. | |
| 2017/0255802 | A1 | 9/2017 | Falk et al. | |
| 2017/0269588 | A1 | 9/2017 | Lema et al. | |
| 2017/0301111 | A1 | 10/2017 | Zhao et al. | |
| 2018/0120847 | A1 | 5/2018 | Chen | |
| 2018/0165544 | A1* | 6/2018 | Isert | G06K 9/00664 |
| 2018/0203467 | A1 | 7/2018 | Zhou et al. | |
| 2018/0354511 | A1 | 12/2018 | Meyer et al. | |
| 2019/0094866 | A1 | 3/2019 | Moore et al. | |
| 2019/0361452 | A1 | 11/2019 | Tahir et al. | |

OTHER PUBLICATIONS

Notice of Allowance dated Jul. 14, 2021 for U.S. Appl. No. 16/150,585.
PCT International Search Report & Written Opinion dated Jan. 25, 2019 for PCT Application No. PCT/US2018/054142.
Lee, S-H., et al., "Robust Robot Navigation using Polar Coordinates in Dynamic Environments", Journal of Industrial and Intelligent Information, Mar. 2014, pp. 6-10, vol. 2, No. 1.
Fiorini, P., et al., "Motion Planning in Dynamic Environments using Velocity Obstacles", International Journal of Robotics Research, Jan. 1, 1995, pp. 1-40.
Kunwar, F., "Rendezvous-Guidance Trajectory Planning for Robotic Dynamic Obstacle Avoidance and Interception", IEEE Transactions on Systems, Man, and Cybernetics—Part B: Cybernetics, Dec. 2006, pp. 1432-1441, vol. 36, No. 6.
Bis, R., et al., "Velocity Occupancy Space: Robot Navigation and Moving Obstacle Avoidance With Sensor Uncertainty", ASME 2009 Dynamic Systems and Control Conference, vol. 1, Jan. 1, 2009. pp. 363-370, XP055543501.
Nelson, D., et al., "Vector Field Path Following for Miniature Air Vehicles", IEEE Transactions on Robotics, IEEE Service Center, Jun. 2007, pp. 519-529, vol. 23, No. 3.
Alsaab, A., et al., "Improving velocity obstacle approach for obstacle avoidance in indoor environments", 2014 UKACC International Conference on Control (Control), Jul. 9, 2014, pp. 325-330.
Levy, A., et al., "The Extended Velocity Obstacle and applying ORCA in the real world", 2015 IEEE International Conference on Robotics and Automation (ICRA), May 2015, pp. 16-22.
Final Office Action dated Sep. 17, 2019 for U.S. Appl. No. 15/394,647.
Non-Final Office Action dated Feb. 2, 2020 for U.S. Appl. No. 16/150,585.
Gong, Jianwei et al., "VPH+: An enhanced vector polar histogram method for mobile robot obstacle avoidance", Proceedings of the 2007 IEEE International Conference on Mechatronics and Automation, Aug. 5-8, 2007, Harbin, China, pp. 2784 to 2788 (Year: 2007).
Kapadia, Mubbasir et al., "Parallelized egocentric fields for autonomous navigation", The Visual Computer (2012), 28:1209-1227, pp. 1209 to 122 (Year: 2012).
Snape, Jamie et al., "Goal Velocity Obstacles for Spatial Navigation of Multiple Autonomous Robots or Virtual Agents", Autonomous Robots and Multi robot Systems, St. Paul, Minn., 2013, 17 pages (Year: 2013).
Fragoso, Anthony et al., "Dynamically Feasible Motion Planning for Micro Air Vehicles using an Egocylinder", Conference Paper as published at ResearchGate, Sep. 2017, 15 pages (Year: 2017).
"RIS Format Specifications", 9 pages, downloaded on Jan. 31, 2020 from: https://jira.sakaiproject.org/secure/attachment/21845/ RIS+Format+Specifications.pdf (Year: 2020).
Notice of Allowance dated Jan. 15, 2020 for U.S. Appl. No. 15/394,647.
Non-final Office Action dated Sep. 12, 2018 for U.S. Appl. No. 15/394,647.
Non-Final Office Action dated Dec. 10, 2020 for U.S. Appl. No. 16/150,585.
Szadeczky-Kardoss, E.G., et al., "Velocity obstacles for Dubins-like mobile robots", 2017 25th Mediterranean Conference on Control and Automation (MED) Jul. 3-6, 2017. Valletta, Malta, pp. 346-351.

(56) References Cited

OTHER PUBLICATIONS

Gal, O., et al., "Fast and efficient visible trajectories planning for the Dubins UAV model in 3D built-up environments", Robotica, 2014, pp. 143-163, vol. 32.

"Dubins path", Wikipedia article, Old revision dated Aug. 3, 2017, 3 pages.

Van Den Berg, J., et al., "Reciprocal n-Body Collision Avoidance", Robotics Research, STAR 70, pp. 3-19, (c) Springer-Verlag Berlin Heidelberg 2011.

Bohlin, R., et al., "Path Planning Using Lazy PRM", Proceedings of the 2000 IEEE ICRA, San Francisco, CA, Apr. 2000.

Brockers, R., et al., "Vision-Based Obstacle Avoidance for Micro Air Vehicles Using an Egocylindrical Depth Map", International Symposium on Experimental Robots, D. Kulic, et al. (eds.), 2016.

Brockers, R., et al., "Stereo Vision-based Obstacle Avoidance for Micro Air Vehicles using an Egocylindrical Image Space Representation", Proc. SPIE 9836, Micro- and Nanotechnology Sensors, Systems, and Applications VIII, 98361R, May 25, 2016.

Chitsaz, H., et al., "Time-optimal Paths for a Dubins airplane", Proceedings of the 46th IEEE Conference on Decision and Control, New Orleans, LA, USA Dec. 12-14, 2007.

Cole, D., et al., "Using Laser Range Data for 3D SLAM in Outdoor Environments", Proceedings of the 2006 IEEE International Conference on Robotics and Automation, Orlando, Florida, May 2006.

Dolson, J., et al., "Upsampling Range Data in Dynamic Environments", Conference on Computer Vision and Pattern Recognition, 2010.

Dryanovski, I., et al., "Multi-Volume Occupancy Grids: An Efficient Probabilistic 3D Mapping Model for Micro Aerial Vehicle", Proceedings of the IEEE/RSJ International Conference on Intelligent Robotics and Systems, Taipei, Taiwan, Oct. 18-22, 2010 / Proceedings of the IEEE/RSJ International Conference on Intelligent Robotics and Systems, Nov. 2010.

Engel, J., et al., "Semi-Dense Visual Odometry for a Monocular Camera", IEEE International Conference on Computer Vision, 2013. https://www.google.com/url?sa=t&rct=j&q=&esrc=s&source=web&cd=1&ved=0ahUKEwjHyfzysaDWAhWFiVQKHShuDVkQFg-goMAA&url=https%3A%2F%2Fvision.in.tum.de%2F_media%2Fspezial%2Fbib%2Fengel2013iccv.

Engel, J., et al., "Large-Scale Direct SLAM with stereo cameras", International Conference on Intelligent Robots and Systems, 2015. https://www.google.com/url?sa=t&rct=j&q=&esrc=s&source=web&cd=1&ved=0ahUKEwjJj4ifsqDWAhWqsVQKHVuRAMUQFggoMAA&url=https%3A%2F%2Fvision.in.tum.de%2F_media%2Fspezial%2Fbib%2Fengel2015_stereo_lsdslam.

Faulwasser, T., et al., "Constrained reachability and trajectory generation for flat systems", Automatica, 50(4):1151-1159, 2014.

Ferstl, D., et al., "Image Guided Depth Up-sampling using Anisotropic Total Generalized Variation", IEEE International Conference on Computer Vision, Sydney, NSW, Australia, Dec. 1-8, 2013.

Forster, C., et al., "SVO: Fast Semi-Direct Monocular Visual Odometry", IEEE International Conference on Robotics and Automation, Hong Kong Convention and Exhibition Center, Hong Kong, China, May 31-Jun. 7, 2014.

Fragoso, A., et al., "Vision-based Autonomy for Micro-Air Vehicles: A Platform for Global Access to Sustainable, Affordable Aviation", an obstacle avoidance poster at a Caltech session, Jorgensen Lobby—Earle M. Jorgensen Laboratory, Caltech, Nov. 20, 2015.

Fragoso, A., et al., "A Fast Motion Planning Representation for Configuration Flat Robots with Applications to Micro Air Vehicles", American Control Conference, published Sep. 19, 2016.

Fraundorfer, F., et al., "Vision-Based Autonomous Mapping and Exploration Using a Quadrotor MAV", IEEE Int. Conf. on Intelligent Robots and Systems (IROS), 2012. http://people.inf.ethz.ch/lomeier/publications/IROS_2012_autonomous_vision_exploration.pdf.

Frazzoli, E., et al., "Maneuver-Based Motion Planning for Nonlinear Systems With Symmetries", IEEE Transactions on Robotics, vol. 21, No. 6, pp. 1077-1091, Dec. 2005.

Geiger, A., et al., "Efficient Large Scale Stereo Matching", Ascian Conference on Computer Vision, 2010.

Geiger, A., et al., "StereoScan: Dense 3d Reconstruction in Real-time", IEEE Intelligent Vehicles Symposium (IV), Baden-Baden, Germany, Jun. 5-9, 2011.

Geiger, A., et al., "Are we ready for Autonomous Driving?: The KITTI Benchmark Suite", IEEE Conference on Computer Vision and Pattern Recognition (CVPR), May 2012. http://www.cvlibs.net/publications/Geiger2012CVPR.pdf.

Hirschmuller, H., "Accurate and Efficient Stereo Processing by Semi-Global Matching and Mutual Information", IEEE Computer Society Conference on Computer Vision and Pattern Recognition, Jun. 20-25, 2005.

Hornung, A., et al., "OctoMap: an efficient probabilistic 3D mapping framework based on octrees", Auton Robot, 34:189-206, 2013.

Hosni, A., et al., "Temporally Consistent Disparity and Optical Flow via Efficient Spatio-temporal Filtering", Pacific-Rim Symposium on Image and Video Technology (PSIVT), Part I, LNCS 7087, pp. 165-177, 2011. https://pdfs.semanticscholar.org/c551/2e85d44961247f15deb0392c01e5bbd6e345.pdf?_ga=2.9547063.326711943.1505247615-962823624.1505247615.

Kahler, O., et al., "Hierarchical Voxel Block Hashing for Efficient Integration of Depth Images", IEEE Conference on Robotics and Automation Letters (ICRA), vol. 1, Issue 1, pp. 192-197, (accepted Dec. 2015) Jan. 2016.

Keshavan, J., et al., "Autonomous Vision-Based Navigation of a Quadrotor in Corridor-Like Environments", Micro Air Vehicles, 7(2):111-123, 2015.

Kitt, B., et al., "Visual Odometry based on Stereo Image Sequences with RANSAC-based Outlier Rejection Scheme", Intelligent Vehicle Symposium, 2010. http://www.cvlibs.net/publications/Kitt2010IV.pdf.

Kopf, J., et al., "Joint Bilateral Upsampling", ACM Transactions on Graphics, vol. 26, No. 3, Article 96, Jul. 2007.

Liu, M. Y., et al., "Joint Geodesic Upsampling of Depth Images", Conference on Computer Vision and Pattern Recognition, 2013.

Lu, J., et al., "Sparse Depth Super Resolution", Proceedings of the IEEE International Conference on Computer Vision and Pattern Recognition, Boston, MA, pp. 2245-2253, Jun. 7-12, 2015.

Matsuo, K., et al., "Depth Image Enhancement Using Local Tangent Plane Approximations", International Conference on Computer Vision and Pattern Recognition, 2015.

Matthies, L., et al., "Stereo vision-based obstacle avoidance for micro air vehicles using disparity space", IEEE International Conference on Robotics and Automation (ICRA), Hong Kong Convention and Exhibition Center, Hong Kong, China, pp. 3242-3249, May 31-Jun. 7, 2014.

Mellinger, D., et al., "Minimum Snap Trajectory Generation and Control for Quadrotors", IEEE International Conference on Robotics and Automation (ICRA), Shanghai International Conference Center, Shanghai, China, May 9-13, 2011.

Min, D., et al., "Depth Video Enhancement Based on Weighted Mode Filtering", IEEE Transactions on Image Processing, vol. 21, No. 3, Mar. 2012.

Murray, R. M., et al., "Differential Flatness of Mechanical Control Systems: A Catalog of Prototype Systems", ASME Int'l Mech Eng Congress and Expo, San Francisco, CA, Nov. 12-17, 1995.

Newcombe, R. A., et al., "KinectFusion: Real-Time Dense Surface Mapping and Tracking", IEEE International Symposium on Mixed and Augmented Reality, Science and Technology Proceedings, Basel, Switzerland, Oct. 26-29, 2011.

Ntouskos, V., et al., "Saliency prediction in the coherence theory of attention", Biologically Inspired Cognitive Architectures, vol. 5, pp. 10-28, 2013.

Ntouskos, V., et al., "Confidence driven TGV fusion", ALCOR Vision, Perception and Learning Robotics Lab, Department of Computer, Control and Management Engineering, University of Rome "La Sapienza", Mar. 30, 2016. https://arxiv.org/abs/1603.09302.

Or-El, R., et al., "RGBD-Fusion: Real-Time High Precision Depth Recovery", International Conference on Computer Vision and Pattern Recognition, 2015.

(56) References Cited

OTHER PUBLICATIONS

Otte, M. W., et al., "Path Planning In Image Space For Autonomous Robot Navigation in Unstructured Environments", Journal of Field Robotics, vol. 26, Issue 2, pp. 115-116, Feb. 2009.
Park, J., et al., "High Quality Depth Map Upsampling for 3D-TOF Cameras", IEEE International Conference on Computer Vision, Nov. 2011.
Pham, C. C., et al., "Efficient Spatio-Temporal Local Stereo Matching Using Information Permeability Filtering", International Conference on Image Processing, 2012.
Pizzoli, M., et al., "Remode: Probabilistic, Monocular Dense Reconstruction in Real Time", IEEE International Conference on Robotics and Automation (ICRA), Hong Kong Convention and Exhibition Center, Hong Kong, China, May 31-Jun. 7, 2014.
Powers, C., et al., "Handbook of Unmanned Aerial Vehicles: Chapter 16—Quadrotor Kinematics and Dynamics", Editors: Valavanis & Vachtsevanos, Springer Netherlands, 2015. ISBN 978-90-481-9706-4.
Rathinam, M., et al., "Configuration Flatness of Lagrangian Systems Underactuated by One Control", In Control and Decision Conference (CDC), Kobe, Japan, 1996.
Richardt, C., et al., "Real-Time Spatiotemporal Stereo Matching Using the Dual-Cross-Bilateral Grid", European conference on Computer vision, 2010. http://richardt.name/dcbgrid/DCBGrid-preprint.pdf.
Richter, C., et al., "Polynomial Trajectory Planning for Aggressive Quadrotor Flight in Dense Indoor Environments", Proceedings of the International Symposium of Robotics Research (ISRR), 2013.
Scharstein, D., et al., "A Taxonomy and Evaluation of Dense Two-Frame Stereo Correspondence Algorithms", International Journal of Computer Vision, vol. 47(1/2/3), pp. 7-42, Apr.-Jun. 2002.
Scharstein, D., et al., "High-Resolution Stereo Datasets with Subpixel-Accurate Ground Truth", 36th German Conference on Pattern Recognition (GCPR), Muenster, Germany, Sep. 2-5, 2014.
Schmid, K., et al., "Stereo Vision based indoor/outdoor Navigation for Flying Robots", IEEE/RSJ International Conference on Intelligent Robots and Systems (IROS), Tokyo, Japan, Nov. 3-7, 2013.
Schneider, N., et al., "Semantically Guided Depth Upsampling", arXiv:1608.00753, Aug. 2016. https://www.researchgate.net/publication/305779544_Semantically_Guided_Depth_Upsampling.
Stauffer, C., et al., "Adaptive Background Mixture Models for Real-time Tracking", IEEE International Conference on Computer Vision and Pattern Recognition, vol. 2, Jun. 23-25, 1999.
Thomas, J., et al., "Toward image based visual servoing for aerial grasping and perching", IEEE International Conference on Robotics & Automation (ICRA), Hong Kong Convention and Exhibition Center, Hong Kong, China, May 31-Jun. 7, 2014.
Unger, C., et al., "Probabilistic Disparity Fusion for Real-time Motion Stereo", Asian Conference on Computer Vision, Queenstown, Nouvelle-Zélande, 2010. https://www.researchgate.net/publication/47363526_Probabilistic_Disparity_Fusion_for_Real-Time_Motion-Stereo.
Yang, Q., et al., "Spatial-depth Super Resolution for Range Images", IEEE Conference on Computer Vision and Pattern Recognition, Jun. 17-22, 2007.
Zhang, G., et al., "Consistent Depth Maps Recovery from a Video Sequence", IEEE Transactions on Pattern Analysis and Machine Intelligence, vol. 31, No. 6, Jun. 2009.

* cited by examiner

GAUSSIAN MIXTURE MODELS FOR TEMPORAL DEPTH FUSION

CROSS-REFERENCE TO RELATED APPLICATIONS

This application is a continuation-in-part of the following commonly-assigned applications all of which applications are incorporated by reference herein in their entirety:

U.S. patent application Ser. No. 15/394,647 now U.S. Pat. No. 10,665,115, filed on Dec. 29, 2016 and issued on May 26, 2020, with inventor(s) Anthony T. S. Fragoso, Larry H. Matthies, Roland Brockers, and Richard M. Murray, entitled "CONTROLLING UNMANNED AERIAL VEHICLES TO AVOID OBSTACLE COLLISION," which application claims priority to Provisional Application Ser. No. 62/274,924, filed on Jan. 5, 2016, with inventor(s) Roland Brockers, Stephan M. Weiss, Larry H. Matthies, and Anthony T. Fragoso, entitled "Fast Autonomous Obstacle Avoidance for Micro Air Vehicle Flight in Highly Cluttered Environments"; and Provisional Application Ser. No. 62/397,284, filed on Sep. 20, 2016, with inventor(s) Anthony T. Fragoso, Larry H. Matthies, and Richard M. Murray, entitled "FAST MOTION PLANNING REPRESENTATION FOR MICRO AIR VEHICLES".

STATEMENT REGARDING FEDERALLY SPONSORED RESEARCH AND DEVELOPMENT

The invention described herein was made in the performance of work under NASA Contract NNN12AA01C, and is subject to the provisions of Public Law 96-517 (35 USC 202) in which the contractor has elected to retain title.

BACKGROUND OF THE INVENTION

1. Field of the Invention

The present invention relates generally to collision avoidance for a moving robot, and in particular, to a method, apparatus, system, and article of manufacture for using Gaussian mixture models for temporal depth fusion to overcome imperfections in depth maps produced by three-dimensional (3D) sensors.

2. Description of the Related Art (Note: This application references a number of different publications as indicated throughout the specification by reference numbers enclosed in brackets, e.g., [x]. A list of these different publications ordered according to these reference numbers can be found below in the section entitled "References." Each of these publications is incorporated by reference herein).

On-board obstacle detection and avoidance is essential for autonomous vehicle navigation. This is particularly challenging for small micro aerial vehicles (MAVs) that have limited payload and power budget. Vision-based approaches using compact cameras are good alternatives in this context.

There are several fundamental requirements for vision systems for obstacle avoidance. The extracted model should be sufficiently dense and accurate with a wide depth range to handle near and far objects. The model should be stable and consistent as the vehicles moves around and IMOs (independently moving objects) should be detected. Finally, a sufficiently high frame rate is required to enable real time control of the vehicle. Stereo matching is a common technique that addresses these constraints by providing dense depth maps of a scene using passive stereo cameras. It works well both indoors and outdoors, which is an advantage over comparably small active depth sensors, which have very limited range outdoors. The depth range is adjustable via the baseline of the stereo cameras and the resolution of the images; fast, compact implementations of stereo matching are now available and are progressing rapidly.

Stereo matching algorithms with low computational complexity provide depth maps for each frame individually. Therefore, obstacle detection errors are inevitable, due to environmental factors and stereo matching errors. The obstacle avoidance system is prone to errors if these techniques are applied without temporal fusion of the dense depth maps. In the robotics literature, occupancy grid and voxel data structures have been standard approaches [Hornug 2013], [Cole 2006], and [Dryanovski 2010] for temporal fusion in 3D space. These techniques are specifically designed for generating accurate maps of the environment that could be much more complex than is necessary for obstacle avoidance. Image space representations can be an efficient alternative, as proposed in [Otte 2009], [Matthies 2014], [Oleynikova 2015], and [Brockers 2016]. Temporal fusion in image space has potential to reduce stereo depth map errors and extend the depth range at lower computational cost than temporal fusion in 3D space [Hane 2011], [Unger 2011], [Cigla 2017], particularly for reactive navigation in cluttered environments.

Depth perception is fundamental to most approaches to obstacle detection for robotic vehicles, including driverless cars and collision warning sensors for human-driven vehicles. Reliable obstacle detection is particularly challenging for small micro air vehicles, which are the main application focus here. Significant research has been devoted to dense depth perception with stereo matching (see [Scharstein 2002], [Scharstein 2014], and [Geiger 2012]) and active sensors, such as MICROSOFT KINECT, INTEL REALSENSE, and Time-of-Flight cameras. Despite this, depth map errors are still frequent, generally due to the presence of non-Lambertian surfaces, textureless regions, changes in lighting that have uneven effects on the scene, and inherent range limitations of active depth sensors. Obstacle detection errors—false alarms and missed detections—are inevitable if detection is only done with instantaneous frames of depth data.

Such errors can be reduced by temporal fusion. In the robotics literature, temporal fusion in 3D space with occupancy grid or voxel data structures has been a standard approach (see [Hornung 2013], [Cole 2006], and [Dryanovski 2010]. However, temporal fusion can also be done in image space. FIG. 1 illustrates a gray-scale left image 102, an initial disparity map via Semi Global Matching 104, and a temporally fused disparity map 106. The temporal fusion compensates flickers, unreliable disparity estimates, and empty pixels for a denser representation of the surrounding. The use of temporal fusion in image space enables a reduction in obstacle detection error rates at lower computational cost than using more complex depth perception methods or temporal fusion in 3D space, particularly for reactive navigation in cluttered environments. With inverse range as the depth parameterization, image space temporal fusion also avoids problems with defining appropriate 3D map cell sizes when the uncertainty of depth measurements is a strong function of the true depth, as is the case for many sensors. Image space fusion could also be a useful front end to quickly filter inconsistent depth measurements before creating a 3D world model.

Research on depth enhancement has mostly focused on spatial enhancement such as joint depth-color filtering (see [Doson 2010], [Yang 2007], [Park 2011], and [Ferstl 2013]) and up-scaling (see [Liu 2013], [Schneider 2016], [Lu 2015], [Matsuo 2015], and [Min 2012]); while temporal enhancement has been given much less attention. The large literature on simultaneous localization and mapping (SLAM) can be considered a way of fusing temporal data in order to generate a representation of an environment. However, the sparse representation of these techniques is not appropriate for path planning and collision avoidance that require denser representation ([Schmid 2013] and [Matthies 2014]). The multi-view 3D extraction techniques can be adapted to the temporal domain by assigning consecutive frames as multiple observations of a scene. This approach can provide temporal consistency while demanding high computational power due to use of multiple 3D warping.

The literature on temporal fusion of depth data usually assumes rigid and static scenes. IMOs have the potential to be invisible in fused 3D representations under these assumptions, and should be handled carefully for a complete and reliable collision avoidance framework. IMO handling has been given much less attention, limited mostly to feature and optical flow based approaches [Lenz 2011], [Zhou 2014], and [Talukder 2004]. The sparse representations of feature-based techniques are not adequate for collision avoidance, while optical flow techniques are computationally heavy for on-board processing.

Related Work

Temporal fusion of depth data can be classified into three categories. The first group integrates temporal consistency in the cost function during the extraction of 3D. [Zhang 2009] exploits Markov Random Fields constructed on multiple consecutive frames. The independently extracted depth maps are merged through bundle optimization resulting in high computational complexity. In [Pizzoli 2014] monocular dense reconstruction is proposed by describing each pixel as a parametric model to extract depth maps from a multi-view stereo point of view. The approach presented in [Pizzoli 2014] differs from traditional multi-view stereo techniques by introducing online and sequentially updated depth maps. In [Richardt 2010], [Hosni 2011], and [Pham 2012], local edge-aware filters over temporally aggregated cost functions are utilized to determine the depth maps. The SLAM literature, while using sparse representation, exploits online depth updates especially in the key frames. In [Foster 2014], the sparse depth measurements are modeled as a weighted sum of Gaussian and uniform distributions corresponding to inlier and outliers, and the depth search is performed along a restricted region in the epipolar line. On the other hand, in [Engel 2013] a simple Gaussian model is utilized to model depth measurements and the depth search is limited within the standard deviation of the prior hypothesis. The depth update is achieved by multiplications of two distributions as in the Kalman filter update step. This approach is extended to large scale direct SLAM with the addition of stereo cameras in [Engel 2015], where stereo matching is exploited to adjust the monocular scale and increase the number of reliable points. In SLAM techniques, occluded pixels are eliminated from the model according to the variance of the depth values.

The second group relies on the utilization of 3D models, such as voxels or surfaces, to fuse depth data. KinectFusion [Newcombe 2011] gets the depth maps from a KINECT camera active sensor, and these maps are merged through signed distance functions to efficiently represent the 3D surfaces. In RGB-D Fusion [Or-El 2015], the depth and color data captured from RGB-D sensors are merged to increase accuracy of the 3D models. These approaches exploit high power GPUs to meet high precision and real-time requirements. They are generally applicable to indoor 3D model reconstruction that limits the scope of path planning and collision avoidance. In [Song 2015], the raw depth values gathered from active sensors are improved via median filtering among nearby frames in a time window.

The final group involves techniques that approach the temporal fusion problem in a post-processing or filtering framework. [Merrel 2007] proposes a visibility based approach to fuse multiple depth maps into a single depth map. This method requires multiple 3D warping and depth ordering steps for each frame that increases the memory and computation requirement. The resulting depth maps still include noise, since visibility is constrained for each frame independently without any global regularization. In [Hane 2011], depth maps are integrated into a volumetric occupancy grid. Two level height maps are exploited to constrain the motion of a robot in an indoor environment. Regularization is achieved through anisotropic total variation with reduced dimension due to indoor constraints. In [Rumpler 2013], depth estimates of consecutive frames are merged by a probabilistically motivated 3D filtering approach. Each frame receives multiple depth candidates from the preceding frames and the depth assignment is achieved by maximization over the local histogram of mean-shift filtered depth values. This merging step is followed by photometric edge-aware filtering and mesh generation to fill the holes in the depth maps. [Matyunin 2011] utilizes a median filter over consecutive frames to smooth out the noisy measurements then averages the depth values according to the motion estimation between color images and interframe differences. In [Min 2012], optical flow and patch similarity measures are exploited to up-scale low resolution ToF cameras with respect to high resolution color images and provide temporal consistency. [Unger 2011] projects multiple depth hypotheses to a reference view and estimates probability density function via projection uncertainties. The depth candidate with highest probability is assigned to the corresponding pixel. Recently, [Ntouskos 2016] proposes a total generalized variation technique to fuse depth maps from multiple frames. The optimization is executed on a 2.5 D surface obtained by backprojecting the depth maps.

It is important to note that using multiple 3D warpings (back-projection and projection) or optical flow are the two alternatives for data registration for the techniques that consider fusion as a filtering framework. This is a limiting factor in terms of memory and computational complexity for onboard processing. Even the median filter that is a common approach to remove outliers requires high computation. In addition, multi-view techniques suffer from holes created during forward mapping as the motion between frames increases.

Further to the above, one may note that temporal fusion is a common way to relate frame-wise extracted depth maps in various representations of the environment. Temporal depth map consistency can be achieved by incorporating consecutive frames in a cost function with additional constraints on the estimated depth maps [Zhang 2009]. This also can be achieved in a multi-view framework as in [Pizzoli], with complex optimizations to merge consecutive depth maps. In [Richardt 2010] and [Hosni 2011], cost functions are aggregated temporally as an extension to spatial aggregation in order to extract reliable depth maps for each frame. SLAM techniques [Engel 2013] also provide consistency through online depth updates in the key frames, where a simple Gaussian model is utilized to model depth measurements and the depth search is limited within the standard deviation of the prior hypothesis. Recently, [Engel 2015] extended SLAM approaches with introduction of stereo cameras in order to adjust scale parameter in mapping and increase the number of reliable points. However, depth maps from SLAM frameworks are still inadequate for obstacle avoidance due to the sparse representations.

Another group of methods is based on multi-view filtering techniques to improve depth map quality by removing outliers and filling holes. A visibility-based fusion method in [Merrel 2007] requires multiple 3D warpings as well as depth ordering that may not be applicable for on board processing. In [Matyunin 2011], a median filter is used along consecutive frames to filter out outliers and provide smooth depth maps. [Unger 2011] uses projection uncertainties in the reference view to estimate probability density functions of depth hypotheses. As described below, embodiments of the invention have extended Gaussian Mixture Models for temporal depth fusion, updating depth models online with new depth observations. This decreases the memory requirement and computational complexity as well as yields more accurate results compared to recent filtering based techniques.

The most common way to merge multiple depth map observations uses 3D models such as voxels or surfaces [Dryanovski 2010][Droeschel 2015], and [Shen 2003]. The depth data is mapped to 3D coordinates to form volumetric representations of the environment that are widely utilized for generating accurate maps. Grid maps require a lot of memory and computation since the main motivation is the generation of a complete map. On the other hand, less complex and more efficient representations are available for collision avoidance based on image space representations. Recently, [Matthies 2014][Brockers 2016] proposed an efficient 2.5D image space world representation that enables fast collision checking in image space, using an egocylindrical data structure to provide 360° representation of the environment with constant angular resolution. This approach has good potential for fast motion planning.

Research on temporal fusion has mostly focused on rigid or static scene assumptions, where moving objects are neglected. Intruders in an environment have potential to corrupt the 3D representations by violating the static scene assumption. On the other hand, missing IMOs in the scene representation may cause failures especially for reactive collision avoidance. [Kang 2005] exploits two geometric constraints to detect IMOs for moving surveillance cameras based on structure consistency and plane-parallax filtering. Sparse [Lenz 2011][Zhou 2014] and dense [Talukder 2004] optical flows are utilized to detect objects that do not follow the scene flow. Sparse flow is insufficient, especially for close objects that have significant importance for collision avoidance. Dense flow is computationally expensive for onboard processors currently available for MAVs.

SUMMARY OF THE INVENTION

Sensing the 3D environment of a moving vehicle (e.g., a robot, self-driving vehicle, micro-air vehicle, quadcopter, drone, etc.) is essential for collision avoidance. Most 3D sensors produce dense depth maps, which are subject to imperfections due to various environmental factors. Temporal fusion of depth maps is crucial to overcome those. Temporal fusion is traditionally done in 3D space with voxel data structures, but it can be approached by temporal fusion in image space, with potential benefits in reduced memory and computational cost for applications like reactive collision avoidance for micro air vehicles. Embodiments of the invention present an efficient Gaussian Mixture Models based depth map fusion approach, introducing an online update scheme for dense representations. The environment is modeled from an egocentric point of view, where each pixel is represented by a mixture of Gaussian inverse-depth models. Consecutive frames are related to each other by transformations obtained from visual odometry. This approach achieves better accuracy than alternative image space depth map fusion techniques at lower computational cost.

Further to the above, embodiments of the invention use an efficient depth data fusion technique for the on-board vision system of a MAV or other vehicle that enables live obstacle avoidance. In this set-up, forward-looking depth sensors are used to sense the environment, while vehicle poses are estimated by visual-inertial odometry (VIO) or SLAM using an IMU and images from cameras, which may look any direction, including downward. The scene is represented via an egocentric cylinder (as described in the parent patent application) that provides a 360° representation of the environment with constant angular resolution. The fusion algorithm is also extended to handle moving objects with an incremental increase in computational complexity. The output of the visual perception system can be used by motion planning approaches providing online collision avoidance for MAVs in cluttered environments.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

In embodiments of the invention, an efficient depth data fusion technique is used to provide temporally consistent models for path planning and collision avoidance for ground vehicles or micro air vehicles. The solution is inspired by a background modeling framework for surveillance image change detection, where each pixel is represented as a mixture of Gaussian distributions. This compact depth map representation is propagated between frames by forward warping, using platform ego motion estimates, and is updated at each time step using newly observed depth maps. The depth maps can be provided by an active sensor, stereo matching, or structure from motion.

In order to provide temporally consistent disparity maps and denser representation for collision avoidance and path planning, embodiments of the invention provide a sequential depth map filtering approach where each pixel is considered as a mixture of Gaussian models. The problem may be considered from an egocentric point of view by only considering the current field of view and ignoring the previously visited out-of-view regions. This compact representation yields an efficient solution to address the trade-off between computational complexity and accuracy. GMMs (Gaussian Mixture Models) are projected onto the most recent frame with respect to pose estimates gathered from a SLAM (simultaneous localization and mapping) framework and/or from visual-inertial odometry (VIO). Hence, only the pose change between the recent two frames is exploited, which reduces the required number of 3D warpings tremendously. The Gaussian models are updated efficiently with the current depth map observation. This approach unites and extends the efficiency of sparse depth model updates in the SLAM/VIO literature with dense representation of multiview stereo. The use of Gaussian mixtures enables modeling partially occluded pixels due to robot's egomotion or independently moving objects in the scene.

Hardware Environment Details

Figure 1:
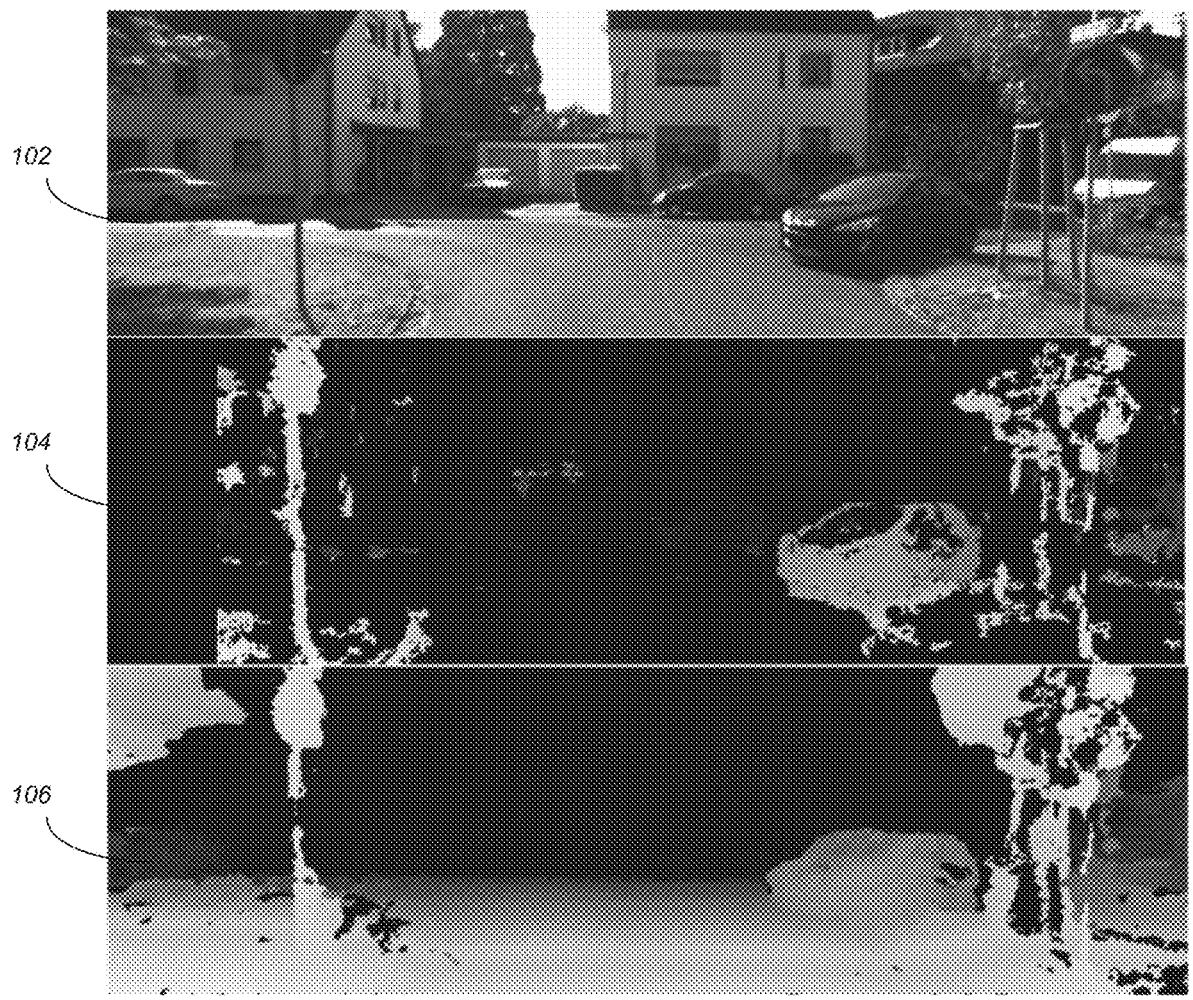
FIG. 1 illustrates a gray-scale left image, an initial disparity map via Semi Global Matching, and a temporally fused disparity map.
Figure 2A:
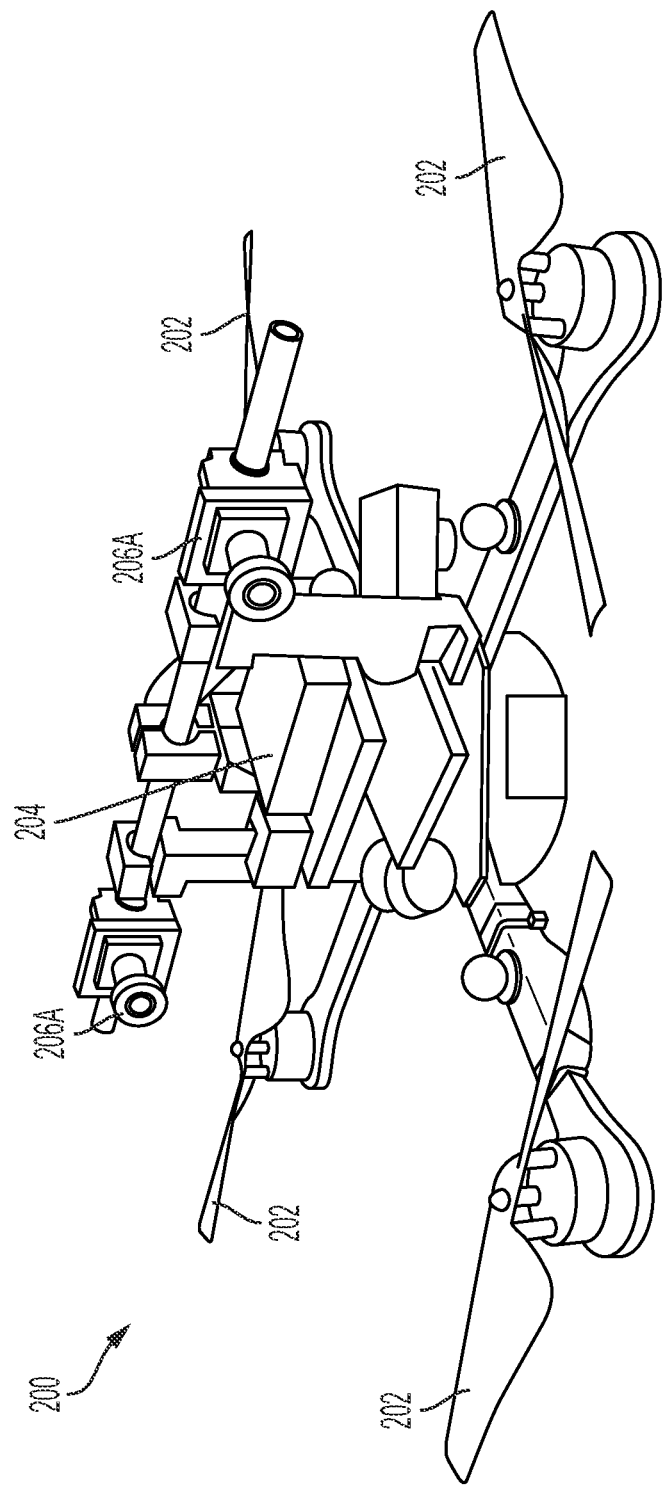
FIGS. 2A and 2B illustrate exemplary quadcopter micro-air vehicles (MAVs) that may be utilized in accordance with one or more embodiments of the invention.
Figure 2B:
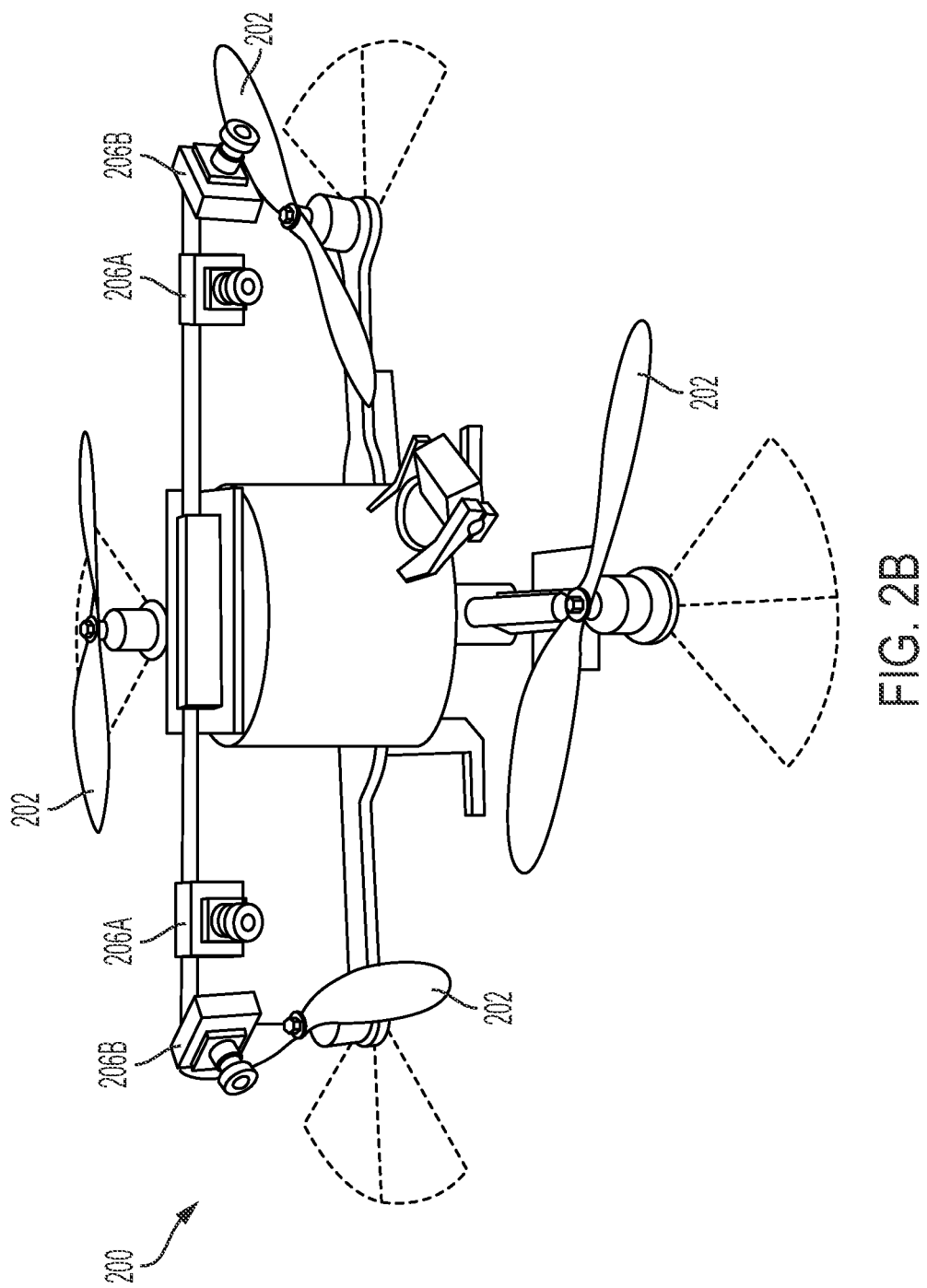

FIGS. 2A and 2B illustrate exemplary micro-air-vehicles that may be used in accordance with one or more embodiments of the invention. While specific examples are illustrated in FIGS. 2A and 2B, embodiments of the invention are not limited to a particular MAV or configuration. FIG. 2A illustrates a quadcopter MAV 200 (e.g., an ASCTEC HUM-MINGBIRD) that is equipped with four (4) rotors 202, a flight computer 204 (e.g., ODROID XU4), that hosts a cell phone based system on a chip (SoC) (e.g., an 8 core EXYNOS5422 system). A stereo camera setup uses two cameras 206A (e.g., MATRIX VISION BLUEFOX-MLC200wG cameras [752×480, gray scale]) that are hardware synchronized. Software on MAV 200 may be running on-board the flight computer 204 using a module (e.g., ROS) for message passing. The vision pipeline including stereo processing, projections onto an egocylinder, and C-space expansion may be executed at 5 Hz with an image resolution of 384×240.

Similar to FIG. 2A, FIG. 2B illustrates a quadcopter MAV 200 (e.g., an ASCTEC PELICAN) that is equipped with a four camera head (i.e., forward facing cameras 206A and side-looking cameras 206B. Thus, in addition to the two cameras 206A, embodiments may extend the total field of regard by adding side-looking cameras 206B with structure from motion (SfM) for depth perception. Alternatively, laser scanners or any device capable of producing point cloud information may be utilized for cameras 206.

GMM Based Temporal Fusion

Use of Gaussian Mixture Models (GMM) is a common technique to perform background/foreground segmentation for detecting moving objects in surveillance video [Stauffer 1999]. This approach combines sequential observations of a pixel (intensity) in a compact representation. The same idea can be extended to represent the environment on a moving platform. This is closely related, but not identical to, formulations that would result from a strict recursive state estimation derivation.

3D sensors produce depth maps in the image domain, and are subject to errors and missing data due to many causes. Even where depth estimates are approximately correct, for many sensors the error in estimated 3D coordinates is a strong function of the true range; for example, this error is quadratic in range for triangulation-based sensors and nonlinear in range for phase-based time-of-flight active optical range sensors. This nonlinear error characteristic complicates the definition and maintenance of 3D grid-based world models. Similarly, most 3D sensors have angular instantaneous fields of view (IFOV), e.g. the projected cone imaged by one pixel, which also leads to sampling issues with 3D grid-based world models. Representing uncertainty in inverse depth in image space avoids these problems. However, gross errors from several sources can lead to ambiguous depth estimation given time sequences of observations; the GMM formulation offers a compact, efficient approach to overcome this ambiguity.

Notation

Let $\vec{x}=(u, v, d)$ be the triplet defining pixel position (u,v), and the disparity value, d, in the image domain. One may assume that, at a time instant t, $\vec{x}$ has a mixture of K Gaussian distributions as follows:

$$P(\vec{x}_t | X_T) = \Sigma_{m=1}^{K} w_m N(\vec{x}; \vec{\mu}_m, \vec{\sigma}_m) \quad (1)$$

where $\vec{\mu}$'s are the mean and $\vec{\sigma}$'s are the variance estimates of the $\vec{x}$ triplet and $X_T$ is the set of observations within time frame of T from the image sequence. In typical GMM applications, each mode has a weighting factor that affects the state of the pixel. In the depth integration version of this model, embodiments exploit an occurrence counter on each mode and decide the current state with respect to occurrence and variance estimates. The variances of u and v are ignored, for the sake of efficiency, since these positions are only utilized to map points to the following frames without suffering quantization noise. Hence the variance of positions does not have a direct effect on the disparity values. Therefore, GMM is modified as follows:

$$P(\vec{x}_t|X_T) = \Sigma_{m=1}^{K} W(O_m, \sigma_m) N(\vec{x}_t; \vec{\mu}_m, \sigma_m) \quad (2)$$

where $O_m$ corresponds to the number of frames that the corresponding mode m is observed and W is a weighting function that defines the contribution of the corresponding mode w.r.t. occurrence and variance. In this study W is chosen to be an impulse function centered at the mode with lowest variance and sufficiently high occurrence count. This choice provides crisp disparity refinement and handles the mixing of background and foreground hypotheses.

Figure 3:
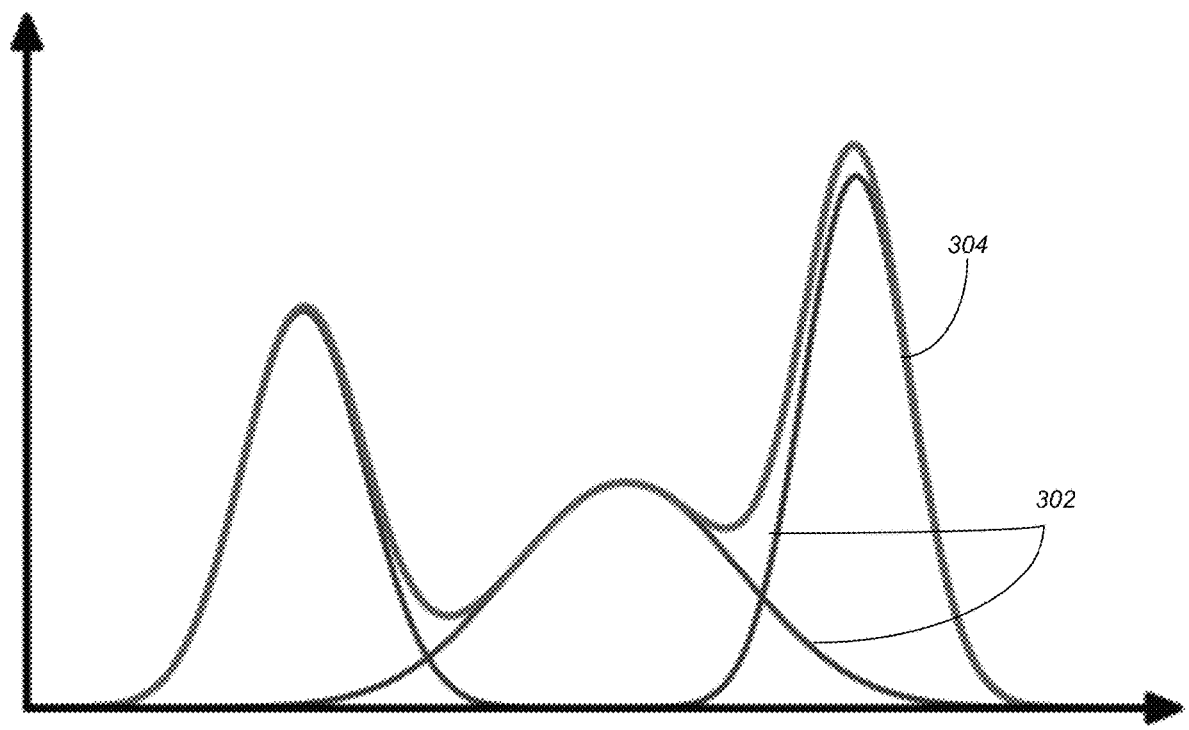
FIG. 3 illustrates a graph of depth value to confidence of the accuracy of the depth value for GMMs in accordance with one or more embodiments of the invention.

FIG. 3 illustrates a graph of depth value to confidence of the accuracy of the depth value for GMMs in accordance with one or more embodiments of the invention. Curves 302 represents the Gaussian mixture distribution and curve 304 represents a state of knowledge/confidence of the depth at a particular pixel. There is one Gaussian mixture model distribution curve for each pixel in a depth map.

Figure 4:
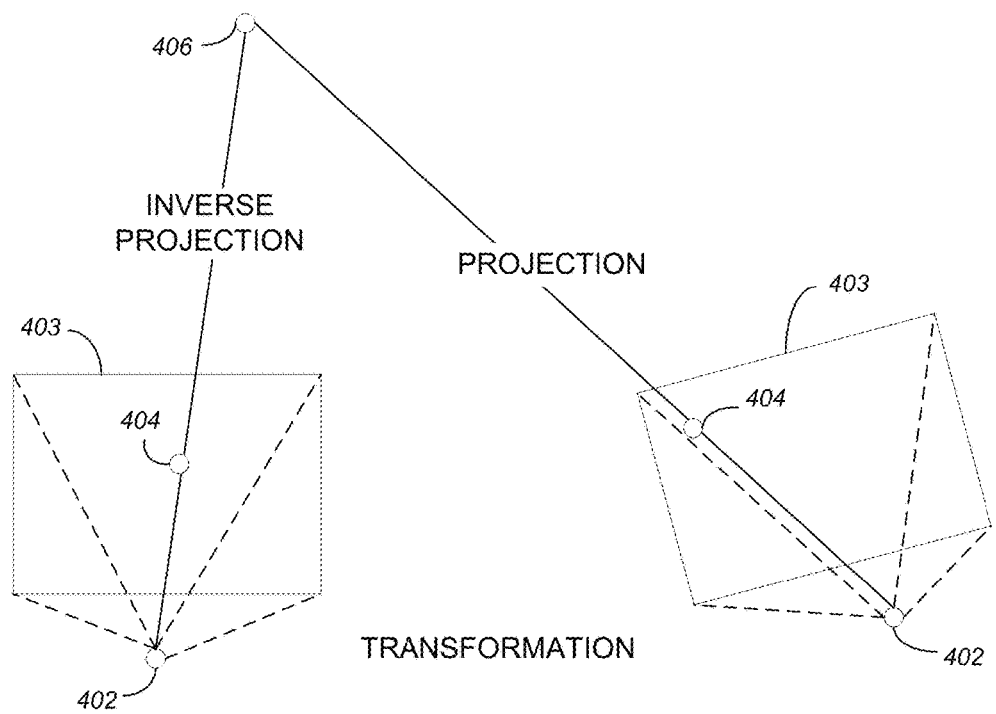
FIG. 4 illustrates the geometry of depth estimation with stereo cameras, in accordance with one or more embodiments of the invention.

FIG. 4 illustrates a mapping of the depth information to a GMM in accordance with one or more embodiments of the invention. As illustrated, the two cameras 402 capture depth information, and the rectangles 403 represent the images. The center of projection 404 are illustrated and connected (via the dotted lines) to the corners of the images to illustrate the viewing frustum of the cameras 402. The rays (solid lines) project through the center of projection 404 (of the image represented by rectangles 403) and the intersection 406 of the projections identify the location of the object in 3D. This intersection 406 therefore represents a single number for the distance and is computed/identified for each pixel of the depth map. The Gaussian distribution of FIG. 3 represents the uncertainty in this depth map estimate and has a mean and variance. The mean may be viewed as the peak of the distribution and the variance is the width of the distribution.

As a robot/MAV moves and another image is captured, an estimate of how the MAV moves is acquired (e.g., change in position and change in orientation). Thus, embodiments of the invention calculate a representation of the depth map from the last point in time and transform it to the current point in time (may be referred to as depth map warping).

SLAM/VIO pose estimates between consecutive frames provide the mapping of a triplet in frame t−1, to the following frame, t, as:

$$\vec{x}_t^h = {}_{t-1}{}^t\theta(\vec{x}_{t-1})\vec{x}_{t-1} \quad (3)$$

where ${}_{t-1}{}^t\theta(\vec{x}_{t-1})$ is the 4×4 transformation matrix that maps to the following frame, and $\vec{x}_t^h$ is the hypothesized model. The mapping between two consecutive frames requires an inverse projection from the image coordinates to 3D, then a transformation based on the camera motion and a re-projection.

GM Modeling

GMM based temporal fusion involves initialization, forward mapping GMM update, and disparity assignment steps. Initialization create a single mode for each pixel (x,y) as follows:

$$N(\vec{x}; \vec{\mu}_0, \sigma_0): \begin{cases} \vec{\mu}_0 = (x, y, d) \\ \sigma_0 = \sigma_{init} \\ O_0 = 1 \end{cases} \quad (4)$$

In (4), $\sigma_{init}$ is set to a high value (i.e., 6), and d is the observed disparity map at the initial frame. The initial high standard deviation indicates that the disparity value that is observed for first time is not trusted. The forward mapping step transfers models from the previous frame to the current frame and sets the valid disparity hypotheses for each pixel. Then, the update step fuses the temporally aggregated models with observation from the current disparity map. Finally, the assignment step outputs a single disparity estimate for each pixel by assessing the mixture distributions at each pixel.

Forward Mapping

At each time step, GMMs from the previous time step are mapped to the current time according to (3). This forward mapping is provided for all of the models of a pixel. Therefore, the maximum number of 3D warpings is limited by the predefined number of models in the mixture, K. Forward mapping may introduce some holes due to quantization and occlusions as a result of the motion of the vehicle. The size of the holes is a function of the vehicle motion between frames; for large motions, some fundamental tools of forward mapping, such as dilation-erosion and Z-buffering, are not applicable since they are utilized when the source pixels have one disparity at a time. In this case, each pixel has a different number of depth models, which results in multiple depth models in the target frame. Thus, there is not a specific disparity map for applying any post-processing. Moreover, GMM depth models are considered to store partially occluded pixels along then temporal axis, hence exploiting a Z-buffer is not attractive, because it eliminates the occluded disparity candidates.

Since each pixel gets contributions from the neighboring pixels, this increases the number of depth hypotheses. The number of possible hypotheses is limited by the predefined number of GMMs, K. Hence, a reduction step is used that averages triplets whose disparity hypothesis are closer than a threshold, i.e. Δd=3. The averaging is performed on all parameters of GMMs as follows:

$$N(\vec{x}^h; \vec{\mu}_m, \sigma_m) = \frac{1}{P}\sum_{s \in S} N(\vec{x}_s^h; \vec{\mu}_s, \sigma_s) \quad (5)$$

where $S = \vec{x}_s^h | \vec{\mu}_m - \vec{\mu}_s | < \Delta d$ is the set of neighbor hypotheses, and p=|S| is the size of the set. The reduction is finalized by picking the best K models according to their standard deviations. This approach fills quantization holes, but it may grow object boundaries. This growing is handled by the rejection step during update of GMMs, which is explained in the following sub-section.

GMM Update

As a new frame is observed (x,y,d), a comparison is conducted between the current disparity map, $\vec{x}(d)$, and the mapped GMMs from the previous frame as:

$$M = \text{argmax}_{m \in [1, K_x]} |d - \vec{\mu}_m(d)| \quad (6)$$

In (6), the mode with the closest disparity model is determined among the $K_x$ prior models of the corresponding triplet. If the best match has disparity distance below a specified threshold, $T_d$, then it is considered to be a proper fit. In that case the update of GMMs, a common way for background update [Stauffer 1999], is achieved as follows:

$$\sigma_m^2 = \alpha\sigma_m^2 + (1-\alpha)|d - \vec{\mu}_M(d)|^2$$

$$\vec{\mu}_M = \alpha\vec{\mu}_M + (1-\alpha)\vec{x}$$

$$O_M = O_M + 1 \quad m \in [1, K_x]$$

$$\sigma_m^2 = \sigma_m^2 + V_0$$

$$O_m = O_m - 1 \quad (7)$$

where the matched mode, M, is updated by the current observation. The remaining modes are penalized by $V_0$ (=0.5) since they do not have any observations. In addition, the occurrence counter is incremented for the matched mode, M, and decremented for the mismatched modes. The update rate, $\alpha$, is fixed at a value that balances rapid convergence with smoothing over many frames. Experiments show that this update process improves performance over prior work at lower computational cost; alternate probabilistic foundations of the update formulation may also be used. If there is no fit, all GMMs of the corresponding pixel are penalized and a new mode is included according to (4). If the number of modes is at the limit, the weakest mode (with respect to disparity variance) is replaced with the current observation. There may be no observation coming from the current disparity map; in that case, the models are not updated while the occurrence count is decreased as a forgetting factor. In order to adapt to temporal changes and preserve efficiency, modes with high occurrence counts but large disparity variances are rejected. These correspond to unreliable modes, since the variances have not decreased despite high occurrence.

Figure 5:
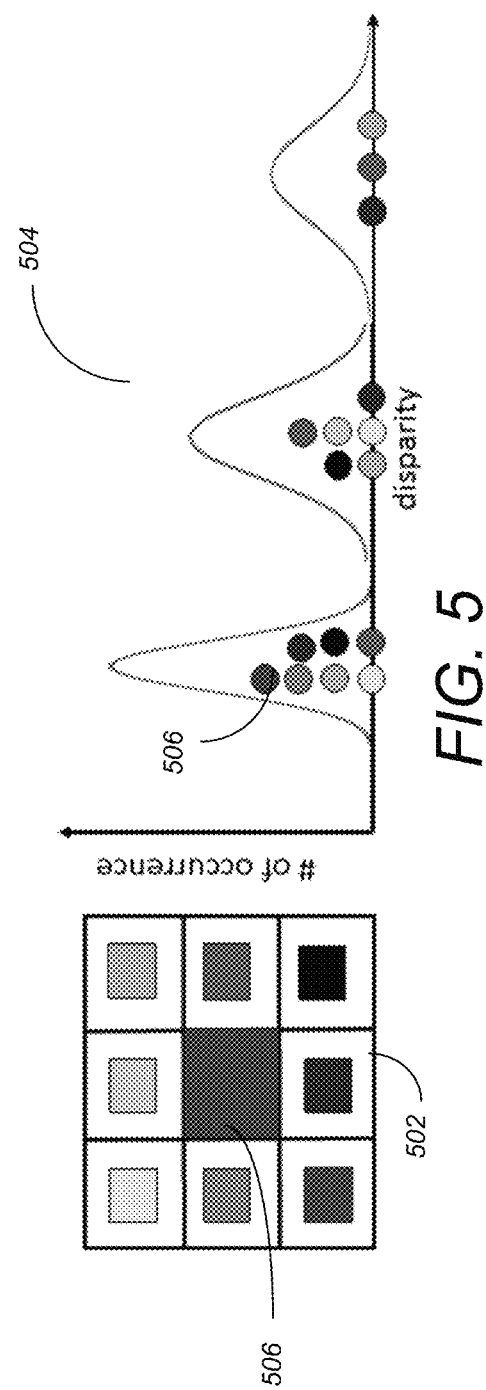
FIG. 5 illustrates updating of Gaussian modes in a 3×3 pixel neighborhood in the forward-warping phase of the GMM algorithm in accordance with one or more embodiments of the invention.

Thus, one may allow the mapped triplets to influence neighboring pixels in the target frame. Accordingly, in FIG. 5, the center pixel 506 receives contributions within a neighborhood (e.g., 3×3 array) that forms a large number of mixture of Gaussians. In other words, the different dots represent measurements that have been assigned to each Gaussian mode with the center dot 506 representing the measurement with the highest confidence as being accurate. Multiple models may be merged for a compact representation.

Disparity Assignment

For motion planning, each pixel is assigned a final disparity estimate according to the occurrence count and the variance of the GMMs. To assign a valid disparity value, the mode that fits the most recently observed disparity must have an occurrence count larger than a threshold (e.g. $O_m > 3$). This rejects temporal flickers among consecutive frames. Also, the variance estimate of the model should also be below a threshold, which enforces the assignment to be reliable (e.g. $\sigma_m < 0.25 \sigma_{init}$). The same conditions are valid for the empty pixels or when there is no match with the prior GMMs in the current disparity map. In this case, the best model having least disparity variance is assigned to the corresponding pixel as long as the occurrence and variance satisfy the conditions.

Computational Analysis

Before describing experimental results, a brief analysis of the computational complexity of the proposed fusion technique is provided. Common multi-view techniques where fusion is considered as a filtering problem are considered as a baseline for comparison. Neglecting the post-processing steps and additional optimizations, the comparison is based on the required number of forward mappings and the memory requirement to hold multiple hypotheses. This gives a general idea of the complexity without getting into details of additional processes. In the multi-view approach, the number of 3D warpings is at least equal to the width of the time window, given as T, and the memory requirement is T×W×H to store all possible contributions from the previous frames. On the other hand, the proposed approach requires K 3D mappings and 5K of image memory (three for triplet means (u,v,d), one for occurrence count and one for disparity variance). Single 3D mapping as given in (3) involves two projections in addition to one transformation in 3D coordinates. In the stereo camera setup, the projections are simplified by basic arithmetic operations over the camera calibration parameters. In general, 10 to 20 frames are utilized during Multiview depth fusion [Or-El 2015][Unger 2011][Ntouskos 2016], while for GMM based fusion, one to three GMMs are sufficient to provide a compact representation of the previous depth maps. Hence, there is an obvious decrease in the number of 3D forward mappings, which is a time-consuming step especially for on board processing. On the other hand, the memory requirement remains on the same scale.

Logical Flow for Model Updates and Disparity Assignment

Figure 6:
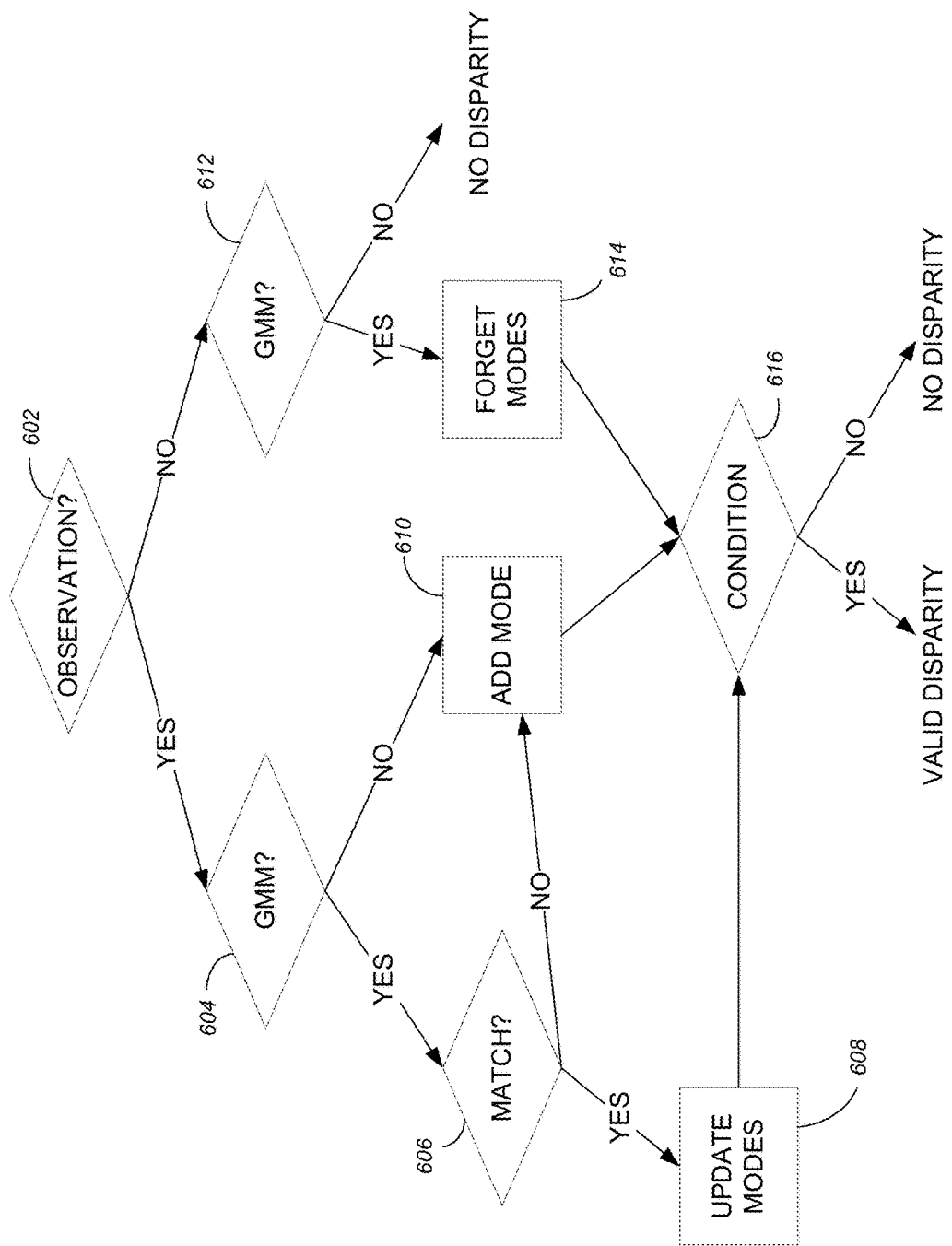
FIG. 6 illustrates the logical flow for temporally fusing depth maps in an image space representation in accordance with one or more embodiments of the invention.

FIG. 6 illustrates the logical flow for temporally fusing depth maps in an image space representation in accordance with one or more embodiments of the invention. At 602, a determination is made regarding whether a new measurement is observed at the current pixel. If there is a new measurement, at 604, a determination is made regarding whether there is a hypothesis for that pixel yet (i.e., whether there is a GMM for the uncertainty of that measurement). If there is a hypothesis/GMM, a determination made at step 506 regarding whether the hypothesis matches an existing hypothesis. If a match is found, the modes/existing hypothesis are updated at 608 accordingly. If there is no match, another hypothesis/mode is added at step 610.

If there is no new measurement observed at step 602, a determination is made regarding whether there is a prediction/GMM from the previous time at step 612. If there is no prediction then there is no disparity between the two images and the process is complete. However, if a previous prediction exists, the confidence number is reduced by reducing occurrence counts and forgetting modes at step 614. In this regard, if there are numerous frames without a measurement for a pixel, then confidence in the depth value for that pixel is reduced. Eventually, the confidence may be reduced to zero (0) (i.e., a condition at 616 has been satisfied and it is determined that there is a valid disparity).

In other words, embodiments of the invention have a prediction of the current point in time, a prediction from the previous point in time, and new measurements from the camera stereo pair (i.e., the observation). The goal is to combine these different values to produce an accurate depth map over time. The new measurements may not agree with the prediction (e.g., something in the scene is moving or there is a gross error in the new measurements, or boundaries are occluded/precluded such as by a lump in distance from the background to the foreground). If the new measurement is close to the prediction (e.g., within a threshold value) then a weighted average of the two GMMs may be conducted at 508 (e.g., based on (7)). If the two GMMs are different, then a new GMM may be created to represent the new measurement at 610. The objective is then to predict the GMM forward to the next time step and obtain another measurement. Further, if the new measurement is more than a threshold distance away from any prior model/hypothesis, old models can be deleted that are lower in confidence than the current model at step 614.

Experimental Results

To evaluate the performance of the proposed approach, embodiments of the invention utilize the well-known KITTI stereo benchmark [Geiger 2012]. This provides an excellent framework to evaluate stereo matching and multi-view extensions, since it contains sets of 20 consecutive test frames, with ground truth at 11th frame; hence, fusion of the previous 10 frames is applicable to refine the target disparity map. In the first set of experiments, comparative results are given with state-of-the-art techniques in terms of computation time and depth map accuracy. Embodiments of the invention fixed the number of modes at K=3 for the proposed approach, which provides a good tradeoff between computation and accuracy. In the second set of experiments, the performance of GMM based fusion is analyzed with respect to the number of modes in the mixture and different visual odometry poses gathered from three different approaches [Geiger 2011], [Kitt 2010], and [Ntouskos 2013]. Throughout the experiments, two different stereo matching algorithms (Semi-Global Matching (SGM) [Hirschmuller 2005] and Efficient Large Scale Stereo Matching (ELAS) [Geiger 2010]) are exploited to observe the enhancement after temporal fusion. Both of the matching techniques yield sub-pixel estimates, so the disparity values after temporal fusion also have sub-pixel accuracy. The parameters for the stereo matching methods are set according to the parameter set given KITTI evaluation benchmark. The evaluation is based on the mean disparity error and the percentage of erroneous pixels with disparity error larger than a threshold, i.e., $\Delta d > 3$.

Comparison with State of the Art

Embodiments of the invention selected TGV [Ntouskos 2016], PFuse [Unger 2011], DSM [Rumpler 2013], and the common median filter as the techniques to compare. In all these techniques, the problem is considered in a filtering framework, as in an approach of embodiments of the invention, where fusion is conducted with estimated disparity maps and camera poses estimated by VO. TGV is a complex optimization framework with high ranking on the KITTI test benchmark, thus it is considered as state-of-the-art in terms of accuracy. Sharing the same experimental setup, published results of TGV are quoted and results of PFuse, DSM and median filter obtained are described. Post-processing steps of these methods are not exploited in order to evaluate the fusion stage only. The tests are conducted on the KITTI stereo 2012 training set, including 194 different sequences with average resolution of 1250×350. This set has mostly static scenes, compared to the 2015 release of the benchmark that has independently moving objects at each frame. Thus, the KITTI 2012 set provides a more focused evaluation of temporal fusion.

In this set-up, visual odometry pose estimates are obtained via [Geiger 2011]. The performances of the temporal fusion algorithms over the disparity maps obtained by SGM and ELAS are given in Table I and Table II, respectively.

TABLE I

The average disparity error and out-3 percentage performances of the temporal fusion techniques over SGM

| Err > 3 | D-Avg | Out-3% | Density % |
| --- | --- | --- | --- |
| SGM [Hirschmuller 2005] | 2.9 | 13.1 | 76 |
| TGV [Ntouskos 2016] | 2.0 | 8.6 | 100 |
| PFuse [Unger 2011] | 2.5 | 11.5 | 93 |
| DSM [Rumpler 2013] | 2.6 | 12.0 | 97 |
| Median | 2.1 | 9.1 | 99 |
| Proposed | 1.8 | 7.9 | 94 |

TABLE II

The average disparity error and out-3 percentage performances of the temporal fusion techniques over ELAS

| Err > 3 | D-Avg | Out-3% | Density % |
| --- | --- | --- | --- |
| ELAS [Hirschmuller 2005] | 1.7 | 9.8 | 76 |
| TGV [Ntouskos 2016] | 1.4 | 7.3 | 100 |
| PFuse [Unger 2011] | 1.8 | 8.9 | 92 |

TABLE II-continued

The average disparity error and out-3 percentage performances of the temporal fusion techniques over ELAS

| Err > 3 | D-Avg | Out-3% | Density % |
| --- | --- | --- | --- |
| DSM [Rumpler 2013] | 1.9 | 9.5 | 99 |
| Median | 1.5 | 7.2 | 99 |
| Proposed | 1.3 | 7.1 | 92 |

Figure 7:
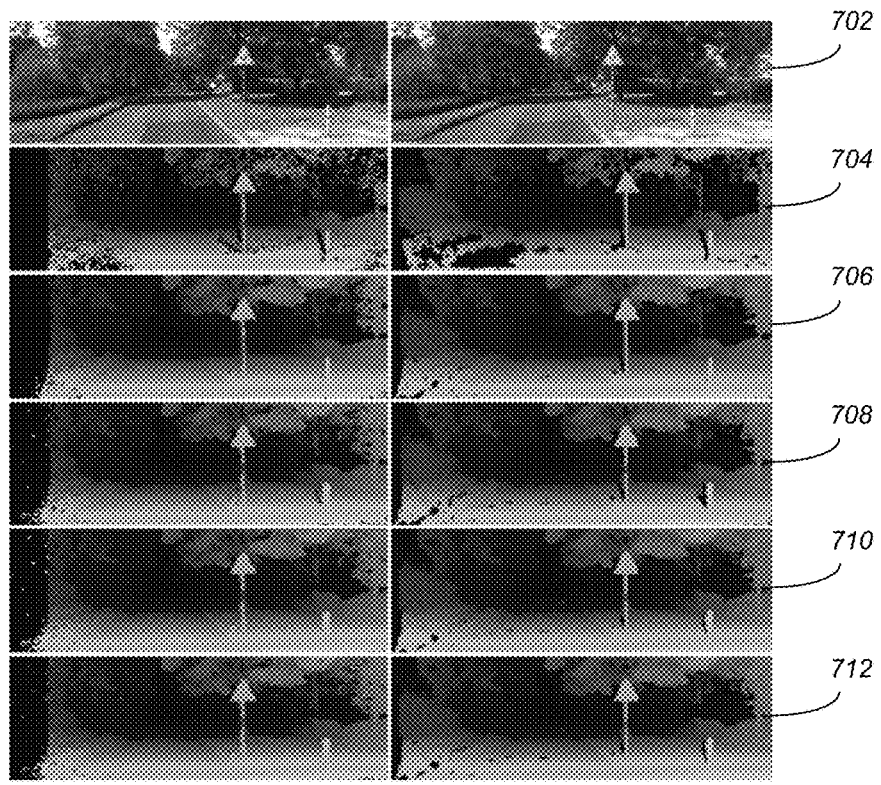
FIGS. 7 and 8 illustrate disparity maps utilized in accordance with one or more embodiments of the invention.
Figure 8:
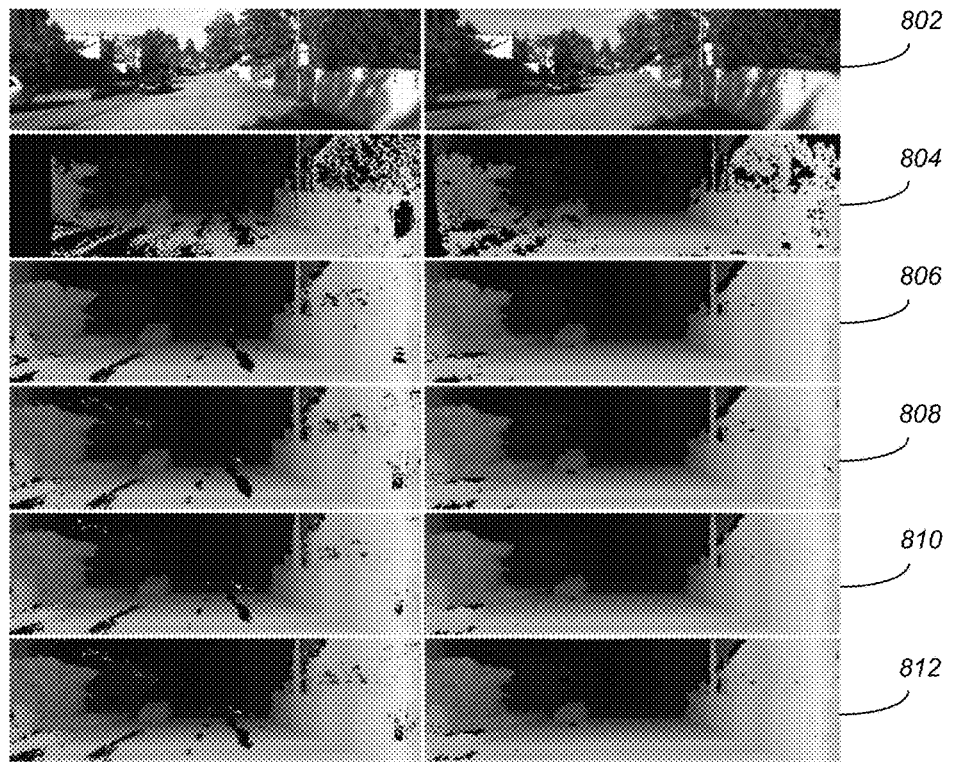

In both cases, the best average disparity error (D-avg) and best outlier percentage (Out-3%) are achieved by the proposed GMM-based fusion approach with K=3. Performance of temporal fusion is generally less with ELAS than with SGM, because SGM results start out worse. For empty pixels with no disparity assignment, background filling is performed before the evaluation. The proposed technique gives better error percentages than the other methods. PFuse and DSM perform poorly compared to even median filtering due to fast motion of the vehicle. DSM is designed for images captured with down looking cameras on airborne platforms and PFuse for parking assistance; thus, both require small disparity changes between consecutive frames. Apart from the accuracy, density of the proposed approach is lower due to hard constraints to reduce the temporal flickering effect and increase reliability. The completeness of the fused disparity maps could increase by decreasing the thresholds; however, in that case temporal consistency would slightly decrease. One can set the thresholds for the proposed approach such that a minimum number of outliers is observed. In FIG. 7 and FIG. 8, disparity maps of some selected scenes are illustrated, which support the results presented in Table I and Table II. In particular, FIG. 7 illustrates the left-right stereo pair 702, the initial disparity maps (SGM left, ELAS right) 704, proposed approach 706, PFuse [Unger 2011] 708, DSM [Rumpler 2013] 710, and Median Filter 712. FIG. 8 illustrates the left-right stereo pair 802, initial disparity maps 804 (SGM left, ELAS right), proposed approach 806, PFuse [Unger 2011] 808, DSM [Rumpler 2013] 810, and Median Filter 812.

One cannot show results of TGV [Ntouskos 2016], since they are not available. However, one can assume they are visually similar to the proposed approach given the similar numerical results. Especially for cases where standard stereo matching fails due to change of lighting and reflection, temporal fusion handles this and propagates the previous reliable disparity hypotheses to the unreliable pixels. Outlier spikes in the disparity maps are minimal in the proposed approach, whereas more spikes may be observed in PFuse, DSM, and Median, especially in FIG. 8. In general, the simpler and lower cost the base stereo algorithm, the more benefit we expect will be obtained from temporal fusion; thus, inexpensive local block matching stereo algorithms should benefit even more.

The proposed approach preserves crisp objects boundaries such as the traffic sign and the pole; on the other hand, objects are enlarged by the other techniques. On the traffic sign in FIG. 7, the background is mixed for the remaining techniques, while the proposed approach preserves the valid disparity estimate. This is achieved by the depth based update step, where the recent observations get higher contribution as they are close to the camera.

The average execution times are given in Table III. The timing for TGV-1 is copied from the related paper, which used GPU implementation for a significant speed-up. The remaining techniques were tested on a 3.4 GHz i7-3770 CPU. For the rest of the methods, the same forward warping tool is exploited to be fair with no additional optimizations. A 3×3 closing operation is implemented for PFuse, DSM and Median Filter to fill the holes to an extent in order to increase their performance. The timings in Table III can be further improved with additional optimization for onboard processing. In Table III, efficiency of the proposed approach is clear and is a result of compact representation, decreased number of 3D warping steps and simple update steps. The processing time for PFuse and DSM are high; PFuse exploits additional 3D warping to test different disparity hypotheses on multiple images, while DSM uses an iterative mean-shift approach that is time consuming. The accuracy of temporal fusion improves as longer time windows are exploited. In this case, the proposed approach does not need additional computation, due to the online frame-at-a-time update, while the rest of the multi-view approaches require further computation.

TABLE III

The execution times of the methods

|  | Time (sec) | Platform |
| --- | --- | --- |
| TGV [Ntouskos 2016] | 70 | GPU |
| PFuse [Unger 2011] | 23 | CPU |
| DSM [Rumpler 2013] | 25 | CPU |
| Median | 1.3 | CPU |
| Proposed | 0.4 | CPU |

Figure 9:
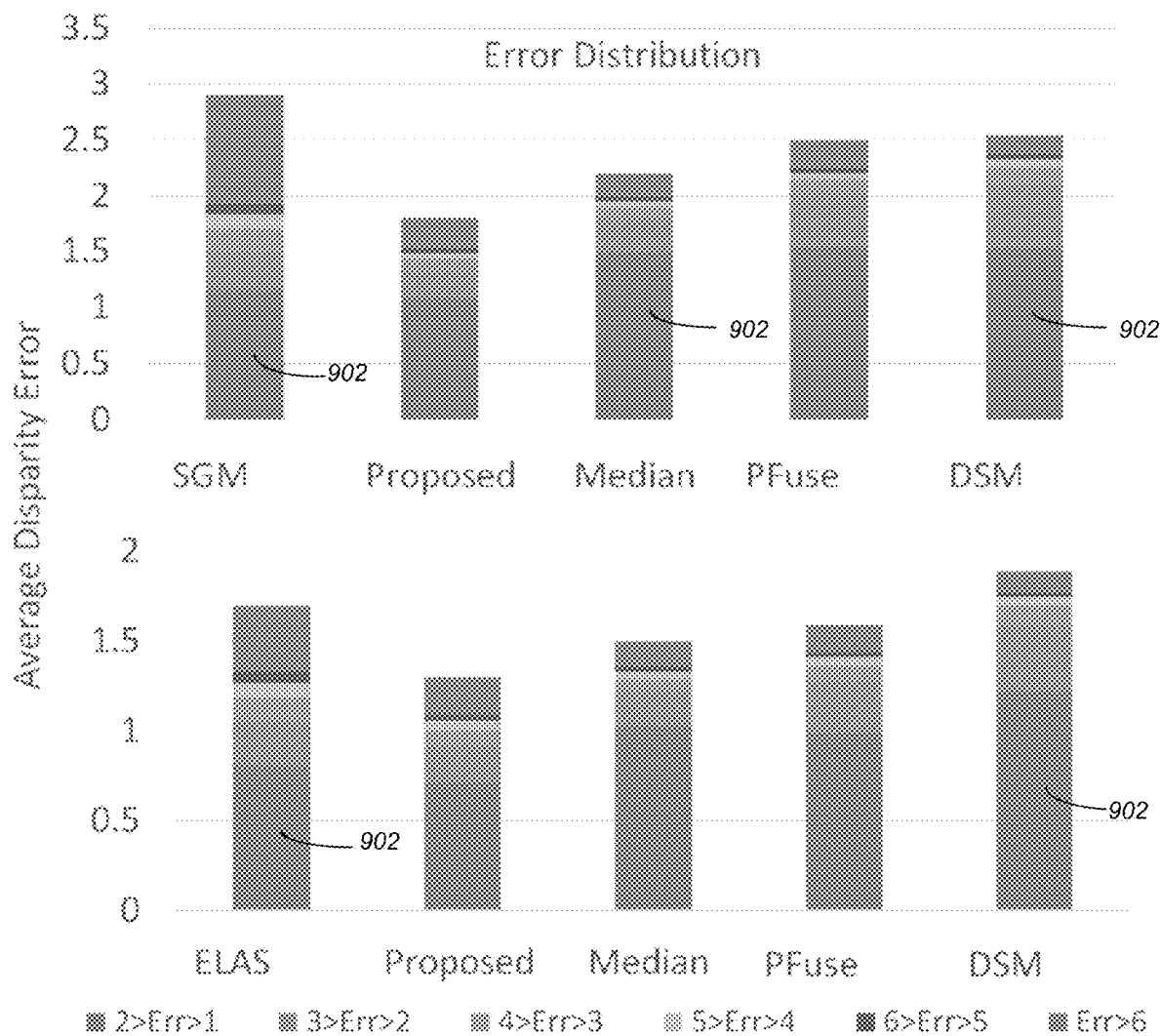
FIG. 9 illustrates the distribution of errors according to different bounds in accordance with one or more embodiments of the invention.

In order to understand the effect of temporal fusion in detail, the percentages of pixels with different disparity errors are illustrated in FIG. 9. In particular, FIG. 9 illustrates the distribution of errors according to different bounds. In these plots, different shading/color 902 indicates the contribution of the pixels of an error region to the average error. For example, after proposed temporal fusion over SGM disparity maps, the pixels with 2>Δd>1 (indicated by shading 902) have the contribution of almost 60% to the average error 1.8. Temporal fusion specifically decreases the number of pixels with high disparity errors. In the meantime, these pixels are shifted to lower error bands as observed by the enlarged percentage of pixels with 2>Δd>1. The refinement is more visible if the initial disparity maps have higher error rates. The error sensitivity may change depending on the application, so providing a complete error distribution yields much clearer understanding of the effects of temporal fusion.

Effects of Parameters and VO

The most critical parameter for GMM based fusion is the number of GMMs, since that affects the model complexity and computation time. Embodiments of the invention extracted distributions of the number of GMMs for two long stereo sequences with 10000 frames from the KITTI odometry dataset [Geiger 2012], as well as the dataset used for stereo evaluation (2134 frames). On the average, the mode distributions are given in Table IV. The distribution of models is related to the complexity of the dataset. The odometry sequence involves more moving objects compared to stereo benchmark sequences, so the percentage of side modes is higher than the stereo benchmark set. Since the first three modes cover 90% of the distribution for the stereo benchmark, that is a good choice for algorithm parameter.

TABLE IV

Mode Distribution over Different Stereo Sequences

| | Mode Distribution | | | | |
| --- | --- | --- | --- | --- | --- |
| | 1 Mode | 2 Mode | 3 Mode | 4 Mode | 5 mode |
| Odometry | 52% | 23% | 13% | 7% | 5% |
| Stereo | 64% | 18% | 9% | 5% | 4% |

The distribution of erroneous pixels with different error thresholds is given in Table V for the proposed approach with three different limiting mode numbers over SGM [Hirschmuller 2005] and ELAS [Geiger 2010] respectively. This error representation yields a comprehensive understanding of the distribution of error. Performance is very similar for all three cases. One of the causes of this small performance difference is that the data set has static scenes.

TABLE V

The percentages of error for different thresholds by use of different number of GMM modes

| % | [Hirschmuller 2005]/ [Geiger 2010] | 1-mode | 2-mode | 3-mode |
| --- | --- | --- | --- | --- |
| Out-1 | 27.1/25.8 | 10.3/24 | 30/23.9 | 29.9/23.8 |
| Out-2 | 16.3/13.5 | 12.5/11 | 12/10.8 | 12.0/10.7 |
| Out-3 | 13.1/9.8 | 8.3/7.4 | 7.9/7.1 | 7.9/7.1 |
| Out-4 | 11.3/7.8 | 6.6/5.6 | 6.2/5.4 | 6.2/5.4 |
| Out-5 | 10.0/6.5 | 5.7/4.6 | 5.3/4.5 | 5.3/4.7 |
| Out-6 | 9.1/5.6 | 4.9/3.9 | 4.6/3.8 | 4.6/3.7 |
| Davg | 2.9/1.7 | 1.9/1.4 | 1.8/1.3 | 1.8/1.3 |

In order to test the robustness of the proposed approach, the same experiments were conducted with three different VO algorithms [Geiger 2011], [Kitt 2010], and [Ntouskos 2013] for 3-mode GMM fusion. Table VI shows the error distributions as the percentage of pixels with quantized errors.

TABLE VI

The percentages of error for different thresholds for GMM based fusion, K = 3, with respect to VO poses

| % | [Hirschmuller 2005]/ Geiger 2010 | [Geiger 2011] | [Kitt 2010] | [Ntouskos 2013] |
| --- | --- | --- | --- | --- |
| Out-1 | 27.1/25.8 | 29.9/24 | 30.2/24.3 | 30.7/24.7 |
| Out-2 | 16.3/13.5 | 12.0/11 | 12.8/11.3 | 13.2/11.7 |
| Out-3 | 13.1/9.8 | 7.9/7.1 | 8.5/7.6 | 8.7/7.9 |
| Out-4 | 11.3/7.8 | 6.2/5.4 | 6.6/5.9 | 6.8/6.0 |
| Out-5 | 10.0/6.5 | 5.3/4.4 | 5.6/4.8 | 5.7/4.9 |
| Out-6 | 9.1/5.6 | 4.6/3.7 | 4.9/4.1 | 4.9/4.2 |
| Davg | 2.9/1.7 | 1.8/1.3 | 1.8/1.4 | 1.8/1.4 |

The VO poses provided by [Kitt 2010] are improved in [Geiger 2011] which is a newer study. [Ntouskos 2013] has the worst VO pose estimates among the three, which are used in TGV [Ntouskos 2016]. According to the results in Table VI, the accuracy of VO poses affects the performance of temporal refinement, as expected. However, all VO poses result in same average disparity error and the differences for high error percentages are almost insignificant. On the other hand, the difference for low error pixels rates is significant. These show that the proposed approach is robust against different visual odometry accuracy in terms of average disparity error as long as VO performs well enough to relate consecutive frames.

Temporal Depth Fusion Conclusions

As described above, embodiments of the invention provide an efficient GMM inspired approach to fuse disparity maps temporally. Each pixel is represented by a mixture of multiple models accumulated through previous observations. This compact representation is mapped to the following frame via the 3D transformation between camera poses. The models are utilized to refine the recent disparity observations and updated for the next frames. The online update approach fuses temporal data efficiently and does not require any time window. According to comprehensive experiments, the proposed approach is an efficient alternative for the state-of-the-art with far lower computational complexity and competitive accuracy. Such an approach yields temporally consistent, flicker-free disparity maps with fewer errors and more complete representation, which are vital for collision avoidance. Use of multiple models may also enable the detection and segmentation of independently moving objects in complex environments.

Image-Based Visual Perception and Representation for Collision Avoidance

As described above and in the parent application, embodiments of the invention provide a novel-on-board perception system for collision avoidance by moving vehicles, including micro air vehicles (MAV). An egocentric cylindrical representation is utilized to model the world using forward-looking stereo vision; other representations are possible, including an egosphere. This efficient representation enables a 360° field of regard, as the vehicle moves around and disparity maps are fused temporally on the cylindrical map. For this purpose, embodiments of the invention provide a new Gaussian Mixture Models-based disparity image fusion methodology, with an extension to handle independently moving objects (IMO). The extension improves scene models in case of moving objects, where standard temporal fusion approaches cannot detect movers and introduce errors in world models due to the common static scene assumption. The on-board implementation of the vision pipeline provides disparity maps on a 360° egocentric cylindrical surface at 10 Hz. The perception output is used in embodiments of the invention by real-time motion planning with collision avoidance on the vehicle.

Figure 10:
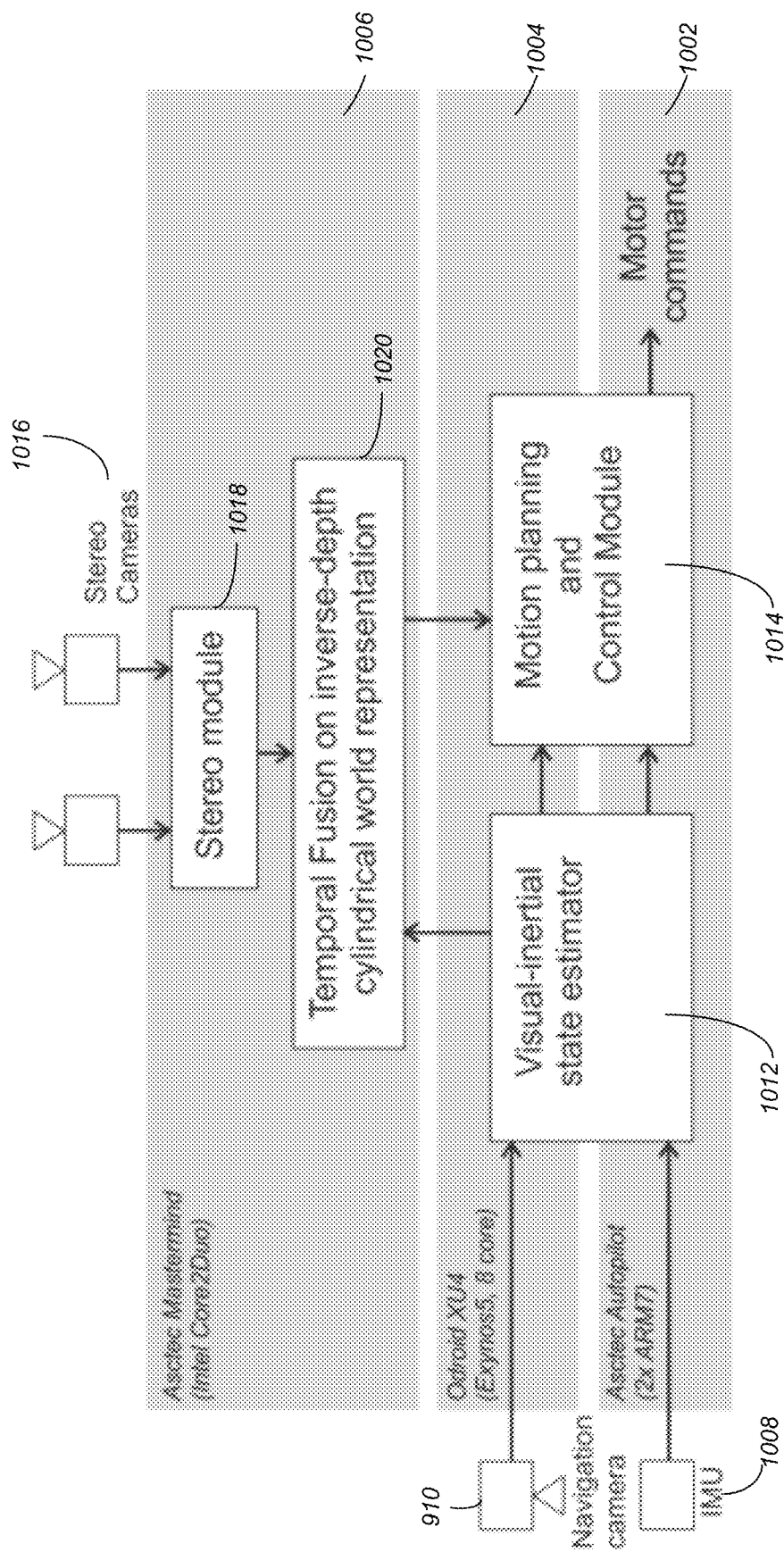
FIG. 10 illustrates an exemplary system architecture on board an ASCTEC PELICAN™ MAV in accordance with one or more embodiments of the invention.

In one or more embodiments of the invention, all vision methodologies are implemented on-board an ASCTEC PELICAN™ MAV that uses a hierarchical processing architecture. FIG. 10 illustrates an exemplary system architecture on board an ASCTEC PELICAN™ MAV in accordance with one or more embodiments of the invention. There are three primary components/levels in the ASCTEC PELICAN™ system of embodiments of the invention: the Autopilot 1002, the ODROID XU4™ 1004 and the Mastermind 1006. The Autopilot 1002 contains the various sensors (e.g., the inertial sensors) that function as an inertial measurement unit (IMU) 1008, and microprocessors that control the sensors and issue commands to control the motor. The mid-level processor ODROID XU4 1004 works with the autopilot 1002, the navigation camera 1010, and the IMU 1008 to provide estimates of the motion. The mid-level processor 1004 may also perform motion planning. Accordingly, together, the Autopilot 1002 and ODROID XU4 1004 provide a visual-inertial state estimator 1012 and motion and planning and control module 1014. The top-level processor, the Mastermind 1006 utilizes a INTEL CORE2DUO™ processor to receive information from the stereo cameras 1016 to provide a stereo module 1018. The Mastermind 1006 also performs the temporal fusion on an inverse-depth cylindrical world representation (also referred to as an egocylinder) 1020.

In view of the above, embodiments of the invention utilize the idea of 2.5D image space world representation on an egocylinder surface [Matthies 2014] for MAV motion planning and collision checking. Forward-looking stereo cameras 1016 are used for depth perception. An IMU 1008 and a downward-looking camera 1010 are used to estimate the pose of the vehicle using algorithms for visual-inertial odometry or SLAM [Forster 2014]. Gaussian mixture models are utilized to fuse frame-wise extracted disparity maps on the egocylinder representation 1020, which is an efficient way to perform fusion in image space. In addition, an IMO handling step included in 1020 yields much more reliable fusion for obstacle avoidance.

Vision System for Collision Avoidance

As described above, Gaussian Mixture Models are widely used to represent background/foreground intensity distributions for detecting moving objects in surveillance [Stauffer 1999]. Successive intensity observations of each pixel are combined in a compact representation. Gaussian models have been used for SLAM [Engel 2013] and extended to Gaussian mixtures for temporal fusion of disparity maps [Cigla 2017]. In both approaches, models are formed in disparity space with inverse depth representation, so that uncertainty is represented for inverse range. [Engel 2013] uses Gaussian models to narrow the search range during the estimation of disparity maps for the following frame, while [Cigla 2017] approaches fusion as a filtering step by relating frame-wise estimated disparity maps. In that manner, the framework proposed in [Cigla 2017] utilizes set-up with stereo matching for depth sensing. Moreover, having the background disparity models of a scene is convenient for detection of IMOs that violate the rigid-static scene assumption.

Independent Moving Object Handling

GMM-based temporal fusion, as with most fusion approaches, uses a rigid and static scene assumption by neglecting IMOs. As described above, in dynamic scenes IMO detection is a crucial step for reliable collision avoidance. Therefore, embodiments of the invention extend the depth fusion framework to handle moving objects as well. Dense optical flow is not practical with current onboard computational limitations of MAVs. Instead, using GMMs enables efficiently detecting IMOs with methods similar to foreground object detection in surveillance videos. The main assumption in surveillance applications is the existence of noticeable intensity differences from the background models. Exactly the same idea can be modified by introducing disparity change with respect to background scene structure for IMO detection in temporal fusion.

The parameterization of GMM-based fusion (described above) may be extended with the addition of an intensity model (I) of the pixels. In the new model, each mode is represented by quadruple $\vec{x}=(u,v,d,I)$. Candidate moving pixels are detected in two steps. First, pixels that do not match to a background mode and have disparity values significantly larger than the background are considered as candidate moving objects. This group is classified into strong and weak candidates. The strong candidates have larger intensity differences, while the weak candidates have intensity values barely differentiated from the background. This type of classification approach helps to grow IMO regions (obtained by strong candidates) at the final step that yield more complete object detection.

Connected component analysis is performed on the strong candidates to eliminate false alarms such as small regions. At that point, a moving object is expected to have sufficiently large area ($T_{area}$) that it cannot be ignored for collision avoidance. Then, those regions are grown within bounding boxes and through weak pixels as long as they have connected paths in between. In that way, objects with visible disparity divergence are detected completely even though they have intensity variation within them. After the detection of candidate moving pixels, disparity values for these pixels are directly copied from the recent disparity observation without any update in GMMs. This does not force consistency among the moving objects, which would require object motion models. Instead, this avoids invisibility of moving objects and prevents incorrect background mode generation.

Egocylinder Representation

Figure 11:
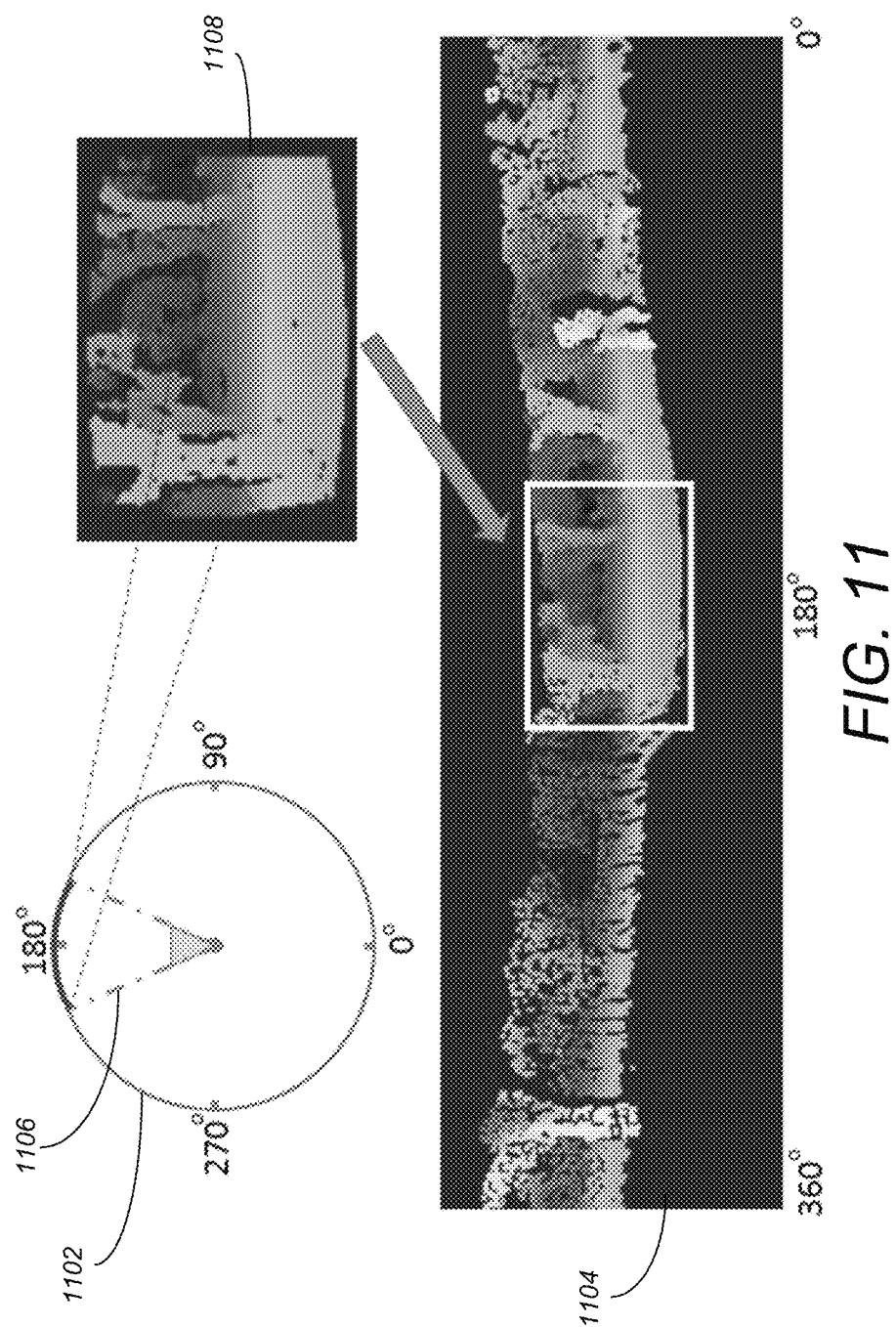
FIG. 11 illustrates a top view of an egocylinder, and a disparity map at a time instant in accordance with one or more embodiments of the invention.

An egocentric cylinder surface image [Brockers 2016] is an efficient way to maintain a persistent 360° representation of the world. As illustrated in FIG. 11 with the top view of egocylinder 1102, the disparity map 1104 at a time instant covers a part (white rectangle) of the egocylinder corresponding to the FOV (field of view) of the stereo cameras. As the vehicle moves around and covers different view angles, temporal fusion accumulates depth data to form a complete scene representation. At each time, new observations are located at the center (forward direction) of the egocylinder image.

With this representation, the update step of temporal fusion is performed on the FOV of stereo cameras (within the white square) where the most recent disparity map is observed. The remaining areas are subject to fade out (or not updated) with a speed related to the forgetting factor. The parameterization of the fusion approach enables defining the fade out rate based to the motion of the vehicle. A constant forgetting factor may be used for the sake of simplicity. This representation is used by a motion planner (similar to [Brockers 2016]) for collision avoidance.

Experimental Results

Two sets of experiments were performed to test the performance of the proposed vision system as a basis for collision avoidance. The first set measured the detection performance of the IMO handling algorithms and compared resulting disparity maps to the original GMM-based temporal fusion algorithm. This used the well-known KITTI stereo benchmark [Geiger 2012], which specifically includes temporal stereo datasets with moving objects. The second set of experiments analyzed on onboard performance with real data captured by a MAV.

Offline Performance Evaluation

The KITTI 2015 stereo dataset provides an excellent benchmark to test the IMO handling algorithm. The dataset includes 194 different scenes with 20 consecutive stereo frames captured from a car. The ground truth disparity maps of center frames are also provided for each sequence. The center frame of each sequence also includes labeled moving objects to evaluate the performance of detection. The average distribution of static and moving regions in this dataset is 85 and 15%, respectively.

With this data, one may use the Semi Global Matching algorithm [Hirschmuller 2005] to extract disparity maps from stereo images for each frame independently. The vehicle poses are estimated through stereo visual odometry [Kitt 2010]. The parameter set for the fusion algorithm is given as follows in Table VII:

TABLE VII

| $\alpha$ | $\alpha_{forget}$ | $\alpha_{init}$ | P | $T_d$ | $T_C$ | $T_{area}$ |
|---|---|---|---|---|---|---|
| 0.1 | 0.05 | 20 | 0.1 | 3 | 5 | 20 |

IMO detection performance is measured through the object labels provided by the KITTI benchmark.

Figure 12:
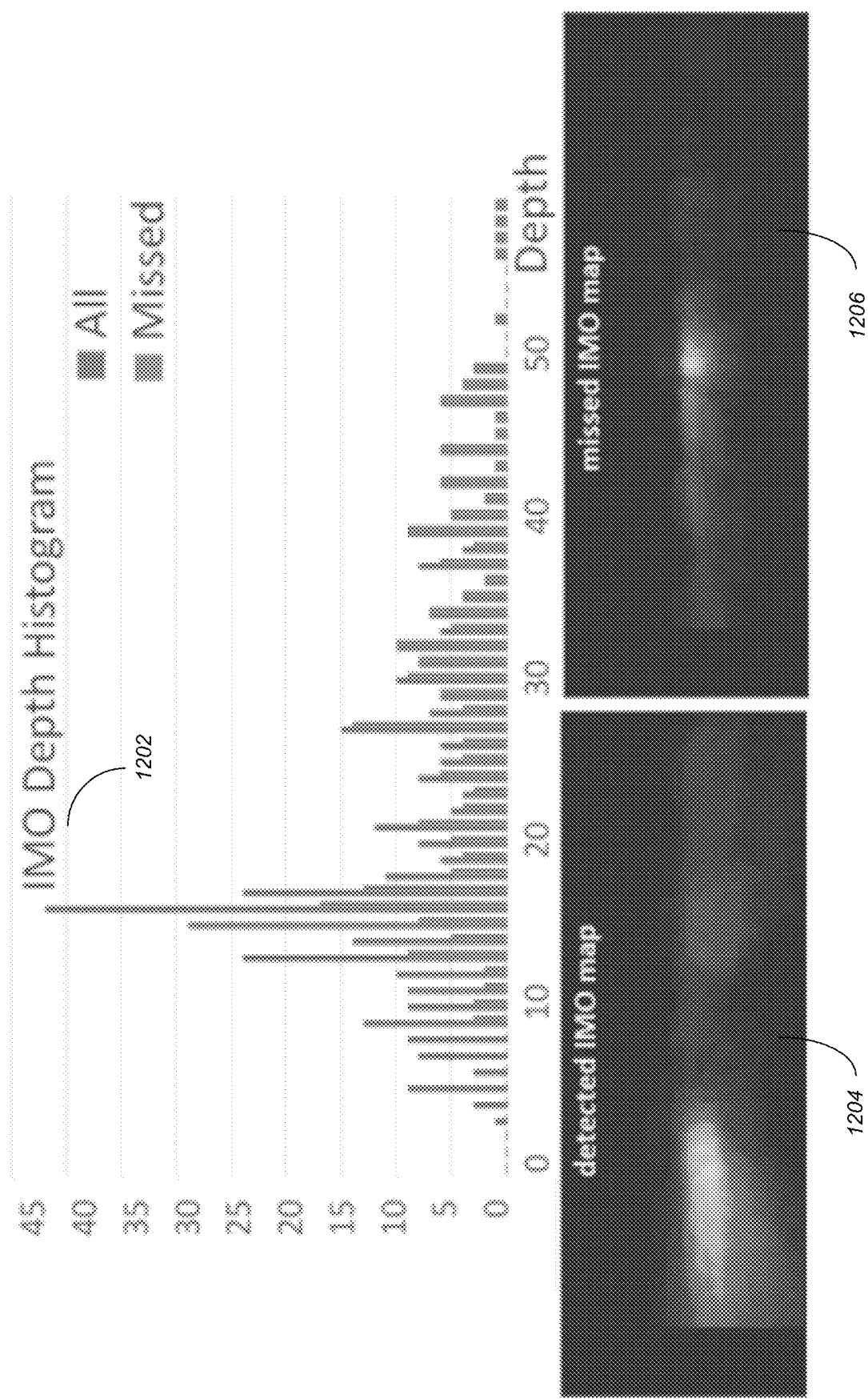
FIG. 12 illustrates a distribution of the distance (meters) of all moving objects in accordance with one or more embodiments of the invention.

The distribution of the distance (meters) of all moving objects is given in the histogram 1202 at the top of FIG. 12 where the missed objects are shown in orange color. Detection performance improves as objects get closer to the observer. Embodiments of the invention detect all of the IMOs that are closer than 9 meters, which are important for collision avoidance. The distributions of the spatial location of detected (1204) and missed (1206) moving objects in image space are also illustrated in FIG. 12 as the false-color images at the bottom of the figure, where brighter colors represent more missed detections. Missed vehicles are generally located at the center of the image and have mostly the same moving direction with the observer. Therefore, these objects are stored and modeled as background in GMMs due to repeated observations. On the other hand, detected objects move along nearby lanes, most of which are located on the left of the observer and move in opposite direction with high probability of collision.

The average distance of detected objects is 12 meters, while missed objects are at an average distance of 25 meters and average disparity error on these objects is 1.8 pixels. Thus, missed vehicles are located at greater distances with small disparity errors in the fused maps.

Table VIII illustrates the performances of stereo matching and temporal fusion with and without IMO handling based on two different error statistics for static and moving regions:

TABLE VIII

| Static/Moving (85/15) % | Out-3% | Avg Disp. Error |
|---|---|---|
| SGM[28] | 12.6/22.7 | 2.6/3.3 |
| GMM[10] | 8.4/61.4 | 1.9/12.1 |
| IMO Handle | 8.6/37.8 | 1.9/5.3 |

In terms of collision avoidance, IMO detection can sense nearby moving objects that are collision risks (the left region of the histogram), while it misses distant objects with low probability of collision. This is a natural consequence of testing disparity differences: as object distance increases, the frame-to-frame disparity difference decreases.

The IMO handling step has an influence on the accuracy of fused disparity maps as well. The precision of the disparity maps is calculated based on two measures: the percentage of pixels with xd>3 (Out-3%) compared to the ground truth disparity maps and the average disparity error. The results for the stereo matching algorithm alone [Hirschmuller 2005], GMM-based fusion [Cigla 2017], and the IMO handling extension are given for static and moving regions in Table VIII above. GMM-based temporal fusion decreases the error ratio by almost 30% compared to frame independent stereo matching. As expected, the IMO handling approach has an insignificant effect in the static regions.

On the other hand, temporal fusion fails for the moving regions that violate the rigid-static scene assumptions. The average disparity error is almost 4 times larger than the initial disparity maps, indicating that the background disparity modes are assigned for those regions. The proposed IMO handling step significantly decreases the error rates of standard temporal fusion while it is still worse compared to frame-wise stereo matching for moving regions. Overall (weighted with average distributions (85-15%)), the proposed approach has the best error rates, providing a trade-off by improving disparity maps along static regions without large failures on the moving pixels.

Figure 13:
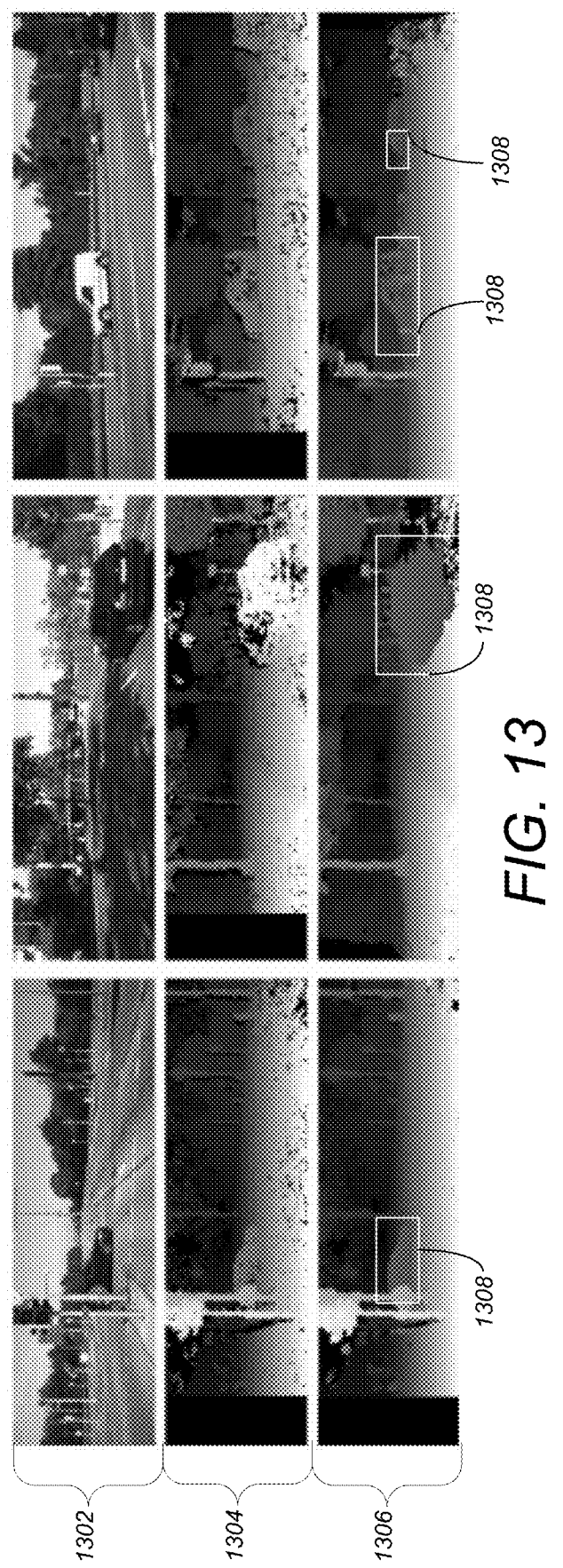
FIG. 13 illustrates left stereo images, disparity maps, and temporally fused disparity maps for scenes including independently moving objects at different distances in accordance with one or more embodiments of the invention.

The output disparity maps are illustrated in FIG. 13 for visual interpretation. The left images and initial disparity maps are shown in rows 1302 and 1304 while temporal fusion results are given in the row 1306. The white rectangles 1308 in the last row 1306 highlight the IMO detection mask of embodiments of the invention. These regions are compensated by the disparity values given in row 1304. The improvement is clear for the static regions, which is the result of accumulating temporal data. On the other hand, as long as the disparity and intensity differences are significant, embodiments of the invention can detect the IMOs with sufficient object coverage.

Onboard Experiments

As described above, referring to FIG. 10, a MAV configured in accordance with embodiments of the invention (e.g., ASCTEC PELICAN™) may be equipped with a 1.86 GHz INTEL CORE2DUO™ processor 1006 running the stereo vision 1018, egocylinder, and temporal fusion modules 1020 and an Odroid XU4 processor 1004 for VIO/SLAM. The forward-looking stereo cameras 1016 (752×480) are installed with a baseline of 25 cm and frame-wise stereo disparity maps are calculated by block matching over a search range of 100 pixels. Temporal fusion is performed on an egocylinder image with resolution of 660×200.

The computation time of stereo matching and the steps of temporal fusion are given in following Table IX:

TABLE IX

| Perception Step | Time (msec) |
|---|---|
| Stereo Matching | 100 |
| Cylindrical Mapping | 14.4 |
| GMM Forward Mapping | 38.5 |
| GMM Selection | 10.6 |
| GMM Update | 3.5 |
| IMO Handling | 2.6 |

The full perception pipeline maintains a 10 Hz update rate using both cores of the Core2Duo, which enables real-time motion planning on the MAV.

Figure 14:
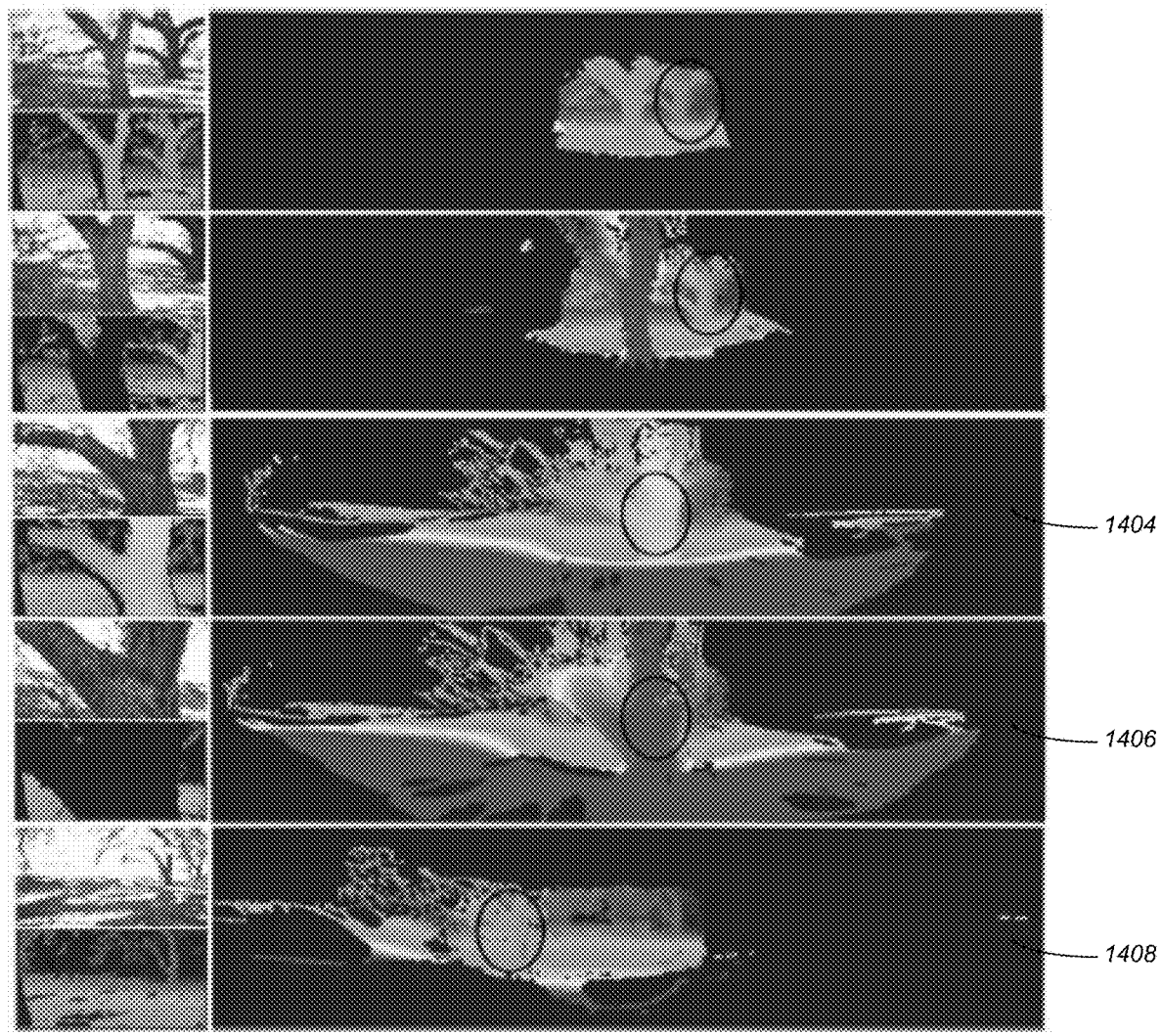
FIG. 14 illustrates left stereo images, disparity maps, and egocylinder representations for a scene in accordance with one or more embodiments of the invention.

Typical results of temporal fusion on the egocylinder are illustrated in FIG. 14. The left stereo image and unfused disparity map (in the first column), and the corresponding egocylinder images (in the second column), are shown for five different time instants in the scenario of moving towards an obstacle. Temporal fusion increases the density of the initial disparity maps. The world representation propagates around the egocylinder as the vehicle moves around, with new frames of stereo data being fused in the forward direction. The consistency of the model can be observed by following the same tree, as shown by the black ellipse, through the successive time instants even though it is out of sight at some point. Moreover, temporal fusion retains memory of close objects in the egocylinder after they disappear from the raw disparity maps because they are too close for the maximum disparity search range. The trees pass out of the FOV (field of view) of the disparity maps as the vehicle approaches, while they are retained in the egocylinder representation. These characteristics benefit collision avoidance by increasing the representation range in both depth and field of regard. In both cases shown in FIGS. 14 (1406 and 1408), collisions can be avoided by the temporally fused egocylinder representation, while it would be failure if only the frame-wise stereo disparity maps were exploited.

Figure 15:
FIG. 15 illustrates typical results of temporal fusion with a GMM including IMO detection and handling in accordance with one or more embodiments of the invention.

The disparity maps and egocylinder representations with and without IMO handling are illustrated in FIG. 15 for two different scenes 1500A and 1500B. The first row 1502 is the left stereo image. Row 1504 shows corresponding disparity maps. Rows 1506 and 1508 show corresponding egocylinder representations without IMO handling and with IMU handling, respectively; the egocylinders have been cropped less than 360° for better visualization. Row 1510 shows IMO detection masks 1510 corresponding to egocylinders that include IMU handling 1508. As is clearly observed, IMOs disappear under the static scene assumption 1506; on the other hand, the IMO approach 1508 detects those objects completely, improving the obstacle avoidance capability. It is also important to note that IMO handling not only detects the moving objects but also preserves the fine structure of the background model. Especially under small motion of the IMOs, due to continuous observation of the same disparity levels, these values are observed in the background model when IMO handling is not active. In the second and third time instants of scene 2 1500B, incorrect disparity assignments are observed on the left side of the tree (the third row), which are the results of fusion of repetitive regions to the background. These regions correspond to false alarms that are not desired for collision avoidance. On the other hand, this effect is removed by IMO handling and a more reliable model of the environment is provided.

Conclusion for Egocylinder Embodiments

Embodiments of the invention provide an efficient visual perception system implemented onboard for MAV collision avoidance. Forward-looking stereo cameras are used to sense the world via disparity maps that are fused temporally using an egocentric cylindrical representation yielding a 360° scene model. Image based temporal depth fusion is extended to handle independently moving objects to provide reliable perception for cluttered and dynamic environments. The IMO handling step detects moving objects and improves the fused disparity maps. The onboard implementation on an ASCTEC PELICAN™ MAV provides 10 Hz visual maps on the egocylinder that are used in live motion control for collision avoidance.

Overview of Logical Flow

Figure 16:
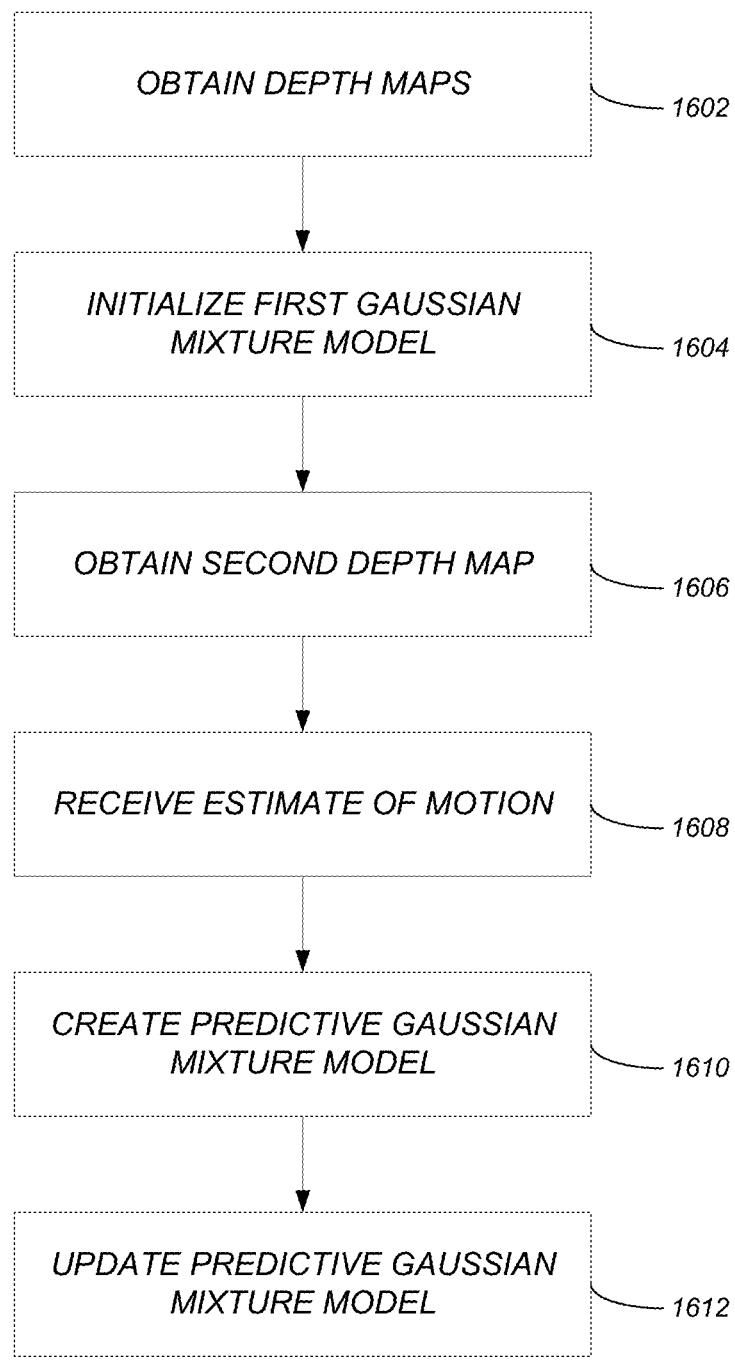
FIG. 16 illustrates an overview of the logical flow for temporally fusing depth maps in an image space representation in accordance with one or more embodiments of the invention.

FIG. 16 illustrates an overview of the logical flow for temporally fusing depth maps in an image space representation in accordance with one or more embodiments of the invention.

At step 1602, a series of depth maps are obtained/acquired from one or more depth sensors (e.g., a stereo pair of cameras on a micro-air vehicle) at a first time.

At step 1604, a first Gaussian mixture model (GMM) is initialized using the first of the series of depth maps. The initializing creates a Gaussian distribution at each pixel of the depth map. A variance of each Gaussian distribution is an estimate of an uncertainty of a corresponding depth estimate.

At step 1606, a second depth map is obtained/acquired from the depth sensors at a second time. The second depth map is obtained subsequent to a movement of a MAV to which the depth sensors are attached.

At step 1608, an estimate of the motion of the depth sensors (from the first time to the second time) is received/computed (e.g., a rotation and translation from the first time to the second time).

At step 1610, a predictive GMM is created at the second time based on a transform of the first GMM and the estimate of the motion. The predictive GMM may be a warping of depth estimates in the depth maps.

At step 1610, the estimate of the motion is combined with a first GMM to create a predicted GMM. At step, 1612, the predicted GMM is updated based on the second depth map. The updating may be performed in accordance with the flow of FIG. 5. In this regard, the following steps may be performed for each pixel on one/each of the depth maps. Based on an estimate of the motion, a determination is made whether a change in a measurement of the depth is observed, at a current pixel, from the first time to the second time (i.e., step 502). Upon determining that a change is observed, a determination is made regarding whether an existing GMM exists for the current pixel (step 504). If it exists, a determination is made whether the existing GMM matches the predictive GMM (step 506). If there is a match, the existing GMM is updated based on the predictive GMM (or vice versa)(step 508). If there is not a match OR there is no existing GMM, a new predictive GMM is created (i.e., a mode is added)(step 510). If a change is not observed at 502, a determination is made regarding whether a predictive GMM exists based on prior observations (step 512). If it exists, the predictive GMM is updated based on a lack of observed change (e.g., modes are forgotten at 514). If the predictive GMM does not exists based on prior observations, no disparity exists and the process is complete. In this regard, based on all of the steps, at step 516, a determination is made regarding whether a valid disparity/no disparity exists between the predictive GMM and the estimate of motion (step 516).

The updated predictive GMM is then used to control movement of a micro-air vehicle (MAV) to avoid collision with obstacles. In this regard, the steps 1606-1612 may be repeated utilizing the updated predictive GMM as the first GMM with the repeating continuing until a MAV has completed a movement mission.

In addition, an intensity model may be utilized for each pixel in the depth maps with an intensity for each pixel including a disparity value. In such an embodiment, candidate moving pixels may be detected. Such candidate moving pixels are defined by/consist of pixels that do not match to a background mode and have disparity values that differ from the background by more than a threshold value. Further, the disparity values are copied for the candidate moving pixels from a recent disparity observation. Such copying avoids the invisibility of moving objects and prevents incorrect background mode generation.

Embodiments of the invention may further implement all of the steps by maintaining a persistent 360° representation of a world using an egocentric cylinder surface image acquired via the depth sensors. In such embodiments, at any time, a field of view of the depth sensors corresponds to a region centered at a forward direction of the egocentric cylinder surface image. In addition, as the MAV moves and covers different view angles, at each time, a new depth map is obtained/acquired, and is located at the forward direction of the egocentric cylinder surface image. The series of new depth maps may be accumulated to form the persistent 360° representation. Lastly, in such embodiments, the updating of the predictive GMM may be performed on a most recent field of view of the depth sensors, while remaining areas of the persistent 360° representation are faded out.

CONCLUSION

This concludes the description of the preferred embodiment of the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES

[Scharstein 2002] D. Scharstein and R. Szeliski, A taxonomy and evaluation of dense two-frame stereo correspondence algorithms. *International Journal of Computer Vision*, 47(1/2/3):7-42, April-June 2002.

[Scharstein 2014] D. Scharstein, H. Hirschmüller, Y. Kitajima, G. Krathwohl, N. Nesic, X. Wang, and P. Westling, Highresolution stereo datasets with subpixel-accurate ground truth. *German Conference on Pattern Recognition*, September 2014.

[Geiger 2012] A. Geiger, P. Lenz and R. Urtasun, Are we ready for Autonomous Driving? The KITTI Benchmark Suite. *Conference on Computer Vision and Pattern Recognition*, 2012.

[Cole 2006] D. Cole and P. Newman, Using Laser Range Data for 3D SLAM in Outdoor Environments. *IEEE International Conference on Robotics and Automation*, 2006.

[Dryanovski 2010] I. Dryanovski, W. Morris and J. Xiao, Multi-volume Occupancy Grids: An Efficient Probabilistic 3D Mapping Model for Micro Aerial Vehicle. *International Conference on Intelligent Robotics and Systems*, 2010.

[Dolson 2010] J. Dolson et al, Upsampling Range Data in Dynamic Environments, *Conference on Computer Vision and Pattern Recognition*, 2010.

[Yang 2007] Q. Yang, R. Yang, J. Davis, and D. Nister. Spatial-depth Super Resolution for Range Images. *Proc. Conference on Computer Vision and Pattern Recognition*, 2007.

[Park 2011] J. Park, H. Kim, Y. W. Tai, M. Brown, and I. Kweon, High Quality Depth Map Up-sampling for 3d-tof cameras. *International Conference on Computer Vision*, 2011.

[Ferstl 2013] D. Ferstl, C. Reinbacher, R. Ranftl, M. Ruether, and H. Bischof. Image Guided Depth Up-sampling using Anisotropic Total Generalized Variation. *International Conference on Computer Vision*, 2013.

[Kopf 2007] J. Kopf et al, Joint Bilateral Up-sampling. SIGGRAPH 2007.

[Liu 2013] M. Y. Liu, O. Tuzel and Y. Taguchi, Joint Geodesic Upsampling of Depth Images. *Conference on Computer Vision and Pattern Recognition*, 2013.

[Schneider 2016] N. Schneider et' al. Semantically Guided Depth Upsampling. *arXiv:*1608.00753, August 2016.

[Lu 2015] J. Lu, D. Forsyth, Sparse Depth Super Resolution, *International Conference on Computer Vision and Pattern Recognition*, 2015.

[Matsuo 2015] K. Matsuo, Y. Aoki, Depth Image Enhancement Using Local Tangent Plane Approximations. *International Conference on Computer Vision and Pattern Recognition*, 2015.

[Min 2012] D. Min, J. Lu and M. N. Do, Depth Video Enhancement Based on Weighted Mode Filtering. *IEEE Transactions on Image Processing*, 21(3), March 2012.

[Schmid 2013] K. Schmid et al, Stereo Vision based indoor/outdoor Navigation for Flying Robots. *International Conference on Intelligent Robots and Systems*, 2013.

[Zhang 2009] G. Zhang et al, consistent Depth Maps Recovery from a Video Sequence. *IEEE Transactions on Pattern Analysis and Machine Intelligence*, 31(6), June 2009.

[Pizzoli 2014] M. Pizzoli, C. Forster and D. Scaramuzza, REMODE: Probabilistic, Monocular Dense Reconstruction in Real Time. *IEEE International Conference on Robotics and Automation* 2014.

[Richardt 2010] C. Richardt et al, Real-time Spatiotemporal Stereo Matching Using the Dual-Cross-Bilateral Grid, *European conference on Computer vision*, 2010.

[Hosni 2011] A. Hosni, C. Rhemann, M. Bleyer, M. Gelautz, Temporally Consistent Disparity and Optical Flow via Efficient Spatio-Temporal Filtering. *Pacific-Rim Synmposium on Image and Video Technology*, 2011.

[Pham 2012] C. C. Pham et al. Efficient Spatio-Temporal Local Stereo Matching Using Information Permeability Filtering. *International Conference on Image Processing*, 2012.

[Foster 2014] C. Foster, M. Pizzoli and D. Scaramuzza. SVO: Fast Semi-Direct Monocular Visual Odometry. *IEEE International Conference on Robotics and Automation*, 2014.

[Engel 2013] J. Engel, J. Strum and D. Cremers, Semi-Dense Visual Odometry for a Monocular Camera. *IEEE International Conference on Computer Vision*, 2013.

[Engel 2015] J. Engel, J. Stueckler and D. Cremers. Large-Scale Direct SLAM with Stereo Cameras. *International Conference on Intelligent Robots and Systems*, 2015.

[Newcombe 2011] A. R. Newcombe et al, KinectFusion: Real-time Dense Surface Mapping and Tracking. *IEEE International Symposium on Mixed and Augmented Reality*, 2011.

[Or-El 2015] R. Or-El et al. RGBD_Fusion: Real-time High Precision Depth Recovery. *International Conference on Computer Vision and Pattern Recognition*, 2015.

[Unger 2011] C. Unger, E. Wahl, P. Strum and S. Ilic, Probabilistic Disparity Fusion for Real-time Motion Stereo. *Machine Vision and Applications*, Vol 25, 2011.

[Ntouskos 2016] V. Ntouskos and F. Pirri, Confidence Driven TGV Fusion. *arXiv:1603.09302*, March 2016.

[Stauffer 1999] C. Stauffer and W. Grimson, Adaptive Background Mixture Models for Real-time Tracking. *International Conference on Computer vision and Pattern Recognition*, 1999.

[Geiger 2011] A. Geiger, J. Ziegler and C. Stiller, StereoScan: Dense 3D Reconstruction in Real-time. *Intelligent Vehicles Symposium*, 2011.

[Kitt 2010] B. Kitt, A. Geiger and H. Lategahn. Visual Odometry based on Stereo Image Sequences with RANSAC-based Outlier Rejection Scheme. *Intelligent Vehicle Symposium*, 2010.

[Ntouskos 2013] V. Ntouskos et al. Saliency Prediction in Coherence Theory of Attention. *Biologically Inspired Cognitive Architectures*, 2013.

[Hirschmuller 2005] H. Hirschmuller, Accurate and Efficient Stereo Processing by Semi-Global Matching and Mutual Information. *International Conference on Computer Vision and Pattern Recognition*, 2005.

[Geiger 2010] A. Geiger, M. Roser and R. Urtasun, Efficient Large Scale Stereo Matching, *Ascian Conference on Computer Vision*, 2010.

[Otte 2009] M. W. Otte, S. Richardson, J. Mulligan and G. Grudic, Path Planning in Image Space for Autonomous Robot Navigation in Unstructured Outdoor Environments, *Journal of Field Robotics*, 2009.

[Oleynikova 2015] H. Oleynikova, D. Honegger and M. Pollefeys, Reactive Avoidance Using Embedded Stereo Vision for MAV Flight, *IEEE International conference on Robotics and Automation*, 2015.

[Brockers 2016] R. Brockers, A. Fragoso, B. Rothrock, C. Lee and L. Matthies, Vision-based Obstacle Avoidance for Micro Air Vehicles using an Egocylindrical Depth Map, *International Symposium on Experimental Robotics*, 2016.

[Cigla 2017] C. Cigla, R. Brockers and L. Matthies, Gaussian Mixture Models for Temporal Depth Fusion, *IEEE Winter Conference on Applications of Computer Vision*, 2017.

[Lenz 2011] P. Lenz, J. Ziegler, A. Geiger and m. Roser, Sparse Scene Flow Segmentation for Moving Object Detection in Urban Environments, *IEEE Intelligent Vehicles Symposium*, 2011.

[Zhou 2014] D. Zhou, V. Fremont, B. Quost and B. Wang, On Modeling Ego-Motion Uncertainty for Moving Object Detection from a Mobile Platform, *IEEE Intelligent Vehicles Symposium*, 2014.

[Talukder 2004] A. Talukder and L. Matthies, Real-time Detection of Moving Objects from Moving Vehicles using Dense Stereo and Optical Flow, *IEEE International Conference on Intelligent Robots and Systems*, 2004.

[Unger 2011] C. Unger, E. Wahl, P. Strum and S. Ilic, Probabilistic Disparity Fusion for Real-time Motion Stereo. *Machine Vision and Applications*, Vol 25, 2011.

[Droeschel 2015] D. Droeschel, M. Nieuwenhuisen, M. Beul, D. Holz, J. Stucker and S. Behnke, Multi-layered Mapping and Navigation for Autonomous Micro Air Vehicles, *Journal of Field Robotics*, 2015.

[Shen 2003] S. Shen, N. Michael and V. Kumar, 3d Indoor Exploration with a Computationally Constrained MAV, *Robotics: science and Systems*, 2003.

[Kang 2005] J. Kang, I. Cohen, G. Medioni and C. Yuan, Detection and Tracking of Moving Objects from a Moving Platform in Presence of Strong Parallax, *IEEE International Conference on Computer Vision*, 2005.

[Forster 2014] C. Forster and M. Pizzoli and D. Scaramuzza, SVO: Fast Semi-Direct Monocular Visual Odometry, *IEEE International Conference on Robotics and Automation*, 2014.

What is claimed is:

1. A method for temporal fusion of depth maps in an image space representation, comprising:
   (a) obtaining a series of depth maps from one or more depth sensors at a first time;
   (b) initializing a first Gaussian mixture model (GMM) using one of the series of depth maps;
   (c) obtaining a second depth map from the one or more depth sensors at a second time;
   (d) receiving an estimate of the motion of the one or more depth sensors from the first time to the second time;
   (e) creating a predictive GMM at the second time based on a transform of the first GMM and the estimate of the motion;
   (f) updating the predictive GMM based on the second depth map; and
   (g) controlling movement of a micro-air vehicle (MAV) to avoid collision with obstacles based on the updated predictive GMM.

2. The method of claim 1, wherein:
the one or more depth sensors comprise a stereo pair of depth sensors on a micro-air vehicle (MAV).

3. The method of claim 1, wherein:
the initializing the first GMM creates a Gaussian distribution at each pixel of the one of the series of depth maps; and
a variance of each Gaussian distribution comprises an estimate of an uncertainty of a corresponding depth estimate.

4. The method of claim 1, wherein:
the second depth map is obtained subsequent to a movement of a micro-air vehicle (MAV) to which the one more depth sensors are attached.

5. The method of claim 4, wherein:
the estimate of the motion comprises a rotation and translation from the first time to the second time.

6. The method of claim 1, wherein:
the predictive GMM comprises a warping of depth estimates in the series of depth maps.

7. The method of claim 1, wherein the updating the predictive GMM comprises:
for each pixel on the one of the series of depth maps:
determining, based on the estimate of the motion, whether a change in a measurement of the depth is observed at a current pixel from the first time to the second time;
upon determining a change is observed, determining whether an existing GMM exists for the current pixel;
upon determining an existing GMM exists for the current pixel, determining whether the existing GMM matches the predictive GMM;
upon determining that the existing GMM matches the predictive GMM, updating the existing GMM based on the predictive GMM;
upon determining that the existing GMM does not match the predictive GMM OR that there is no existing GMM, creating a new predictive GMM;
upon determining a change is not observed, determining whether the predictive GMM exists based on prior observations;
upon determining the predictive GMM exists based on prior observations, updating the predictive GMM based on a lack of observed change;
upon determining a predictive GMM does not exist based on prior observations, determining no disparity exists; and
based on the above steps, determining whether a valid disparity exists between the predictive GMM and the estimate of the motion.

8. The method of claim 1, further comprising:
repeating steps (c)-(f) utilizing the updated predictive GMM as the first GMM, wherein the repeating is conducted until a micro-air vehicle has completed a movement mission.

9. The method of claim 1, further comprising:
utilizing an intensity model for each pixel in the one of the series of depth maps, wherein an intensity for each pixel comprises a disparity value;
detecting candidate moving pixels, wherein candidate moving pixels comprise pixels that do not match to a background mode and have disparity values that exceed a threshold value of the background; and
copying disparity values for the candidate moving pixels from a recent disparity observation, wherein the copying avoids invisibility of moving objects and prevents incorrect background mode generation.

10. The method of claim 1, further comprising:
maintaining a persistent 360° representation of a world using an egocentric cylinder surface image acquired via the one or more depth sensors, wherein:
at any time, a field of view of the one or more depth sensors corresponds to a region centered at a forward direction of the egocentric cylinder surface image;
as a micro-air vehicle (MAV) moves and covers different view angles, at each time, a new series of depth maps are obtained and are located at the forward direction of the egocentric cylinder surface image, wherein the new series of depth maps are accumulated to form the persistent 360° representation; and
the updating the predictive GMM step is performed on a most recent field of view of the one or more depth sensors, and remaining areas of the persistent 360° representation are faded out.

11. An on-board perception system for collision avoidance by micro-air vehicles (MAV) comprising:
(a) a temporal fusion system integrated into the MAV that enables collision avoidance by temporally fusing a series of depth maps in an image space representation, wherein the temporal fusion system:
(1) obtains, at a first time, the series of depth maps from one or more depth sensors that are integrated into the MAV;
(2) initializes a first Gaussian mixture model (GMM) using one of the series of depth maps;
(3) obtains, at a second time, a second depth map from the one or more depth sensors;
(4) receives an estimate of the motion of the one or more depth sensors from the first time to the second time;
(5) creates a predictive GMM at the second time based on a transform of the first GMM and the estimate of the motion;
(6) updates the predictive GMM based on the second depth map; and
(7) controls movement of the MAV to avoid collision with obstacles based on the updated predictive GMM.

12. The on-board perception system of claim 11, wherein:
the one or more depth sensors comprise a stereo pair of depth sensors on a micro-air vehicle (MAV).

13. The on-board perception system of claim 11, wherein:
the temporal fusion system initializes the first GMM by creating a Gaussian distribution at each pixel of the one of the series of depth maps; and
a variance of each Gaussian distribution comprises an estimate of an uncertainty of a corresponding depth estimate.

14. The on-board perception system of claim 11, wherein:
the second depth map is obtained subsequent to a movement of the MAV to which the one more depth sensors are attached.

15. The on-board perception system of claim 14, wherein:
the estimate of the motion comprises a rotation and translation from the first time to the second time.

16. The on-board perception system of claim 11, wherein:
the predictive GMM comprises a warping of depth estimates in the series of depth maps.

17. The on-board perception system of claim 11, wherein the temporal fusion system updates the predictive GMM by:
for each pixel on the one of the series of depth maps:

determining, based on the estimate of the motion, whether a change in a measurement of the depth is observed at a current pixel from the first time to the second time;

upon determining a change is observed, determining whether an existing GMM exists for the current pixel;

upon determining an existing GMM exists for the current pixel, determining whether the existing GMM matches the predictive GMM;

upon determining that the existing GMM matches the predictive GMM, updating the existing GMM based on the predictive GMM;

upon determining that the existing GMM does not match the predictive GMM OR that there is no existing GMM, creating a new predictive GMM;

upon determining a change is not observed, determining whether the predictive GMM exists based on prior observations;

upon determining the predictive GMM exists based on prior observations, updating the predictive GMM based on a lack of observed change;

upon determining the predictive GMM does not exist based on prior observations, determining no disparity exists; and based on the above steps, determining whether a valid disparity exists between the predictive GMM and the estimate of the motion.

18. The on-board perception system of claim 11, wherein the temporal fusion system:

repeats (a)(3)-(a)(6) utilizing the updated predictive GMM as the first GMM, wherein the repeating is conducted until the MAV has completed a movement mission.

19. The on-board perception system of claim 11, wherein the temporal fusion system further:

utilizes an intensity model for each pixel in the one of the series of depth maps, wherein an intensity for each pixel comprises a disparity value;

detects candidate moving pixels, wherein candidate moving pixels comprise pixels that do not match to a background mode and have disparity values that exceed a threshold value of the background; and copies disparity values for the candidate moving pixels from a recent disparity observation, wherein the copying avoids invisibility of moving objects and prevents incorrect background mode generation.

20. The on-board perception system of claim 11, wherein the temporal fusion system further:

maintains a persistent 360° representation of a world using an egocentric cylinder surface image acquired via the one or more depth sensors, wherein:

at any time, a field of view of the one or more depth sensors corresponds to a region centered at a forward direction of the egocentric cylinder surface image;

as the MAV moves and covers different view angles, at each time, a new series of depth maps are obtained and are located at the forward direction of the egocentric cylinder surface image, wherein the new series of depth maps are accumulated to form the persistent 360° representation; and the temporal fusion system updates the predictive GMM based on a most recent field of view of the one or more depth sensors, and remaining areas of the persistent 360° representation are faded out.

* * * * *